(12) United States Patent
Wang et al.

(10) Patent No.: US 9,892,194 B2
(45) Date of Patent: Feb. 13, 2018

(54) TOPIC IDENTIFICATION IN LECTURE VIDEOS

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 951 days.

(21) Appl. No.: 14/245,725

(22) Filed: Apr. 4, 2014

(65) Prior Publication Data

US 2015/0286718 A1 Oct. 8, 2015

(51) Int. Cl.
*G06F 17/30* (2006.01)
(52) U.S. Cl.
CPC .. *G06F 17/30796* (2013.01); *G06F 17/30011* (2013.01); *G06F 17/30038* (2013.01); *G06F 17/3082* (2013.01); *G06F 17/30864* (2013.01); *G06F 17/30867* (2013.01)
(58) Field of Classification Search
CPC ........... G06F 17/30038; G06F 17/3082; G06F 17/30867; G06F 17/30864; G06F 17/30011; G06F 17/30796
See application file for complete search history.

(56) References Cited

U.S. PATENT DOCUMENTS

| | | | |
|---|---|---|---|
| 6,816,858 B1 * | 11/2004 | Coden | G06F 17/30855 386/241 |
| 7,184,959 B2 | 2/2007 | Gibbon et al. | |
| 8,422,787 B2 | 4/2013 | Terao et al. | |
| 2003/0187642 A1 * | 10/2003 | Ponceleon | G10L 15/1822 704/252 |
| 2005/0267871 A1 * | 12/2005 | Marchisio | G06F 17/30672 |
| 2007/0265064 A1 | 11/2007 | Kessman et al. | |
| 2010/0057644 A1 * | 3/2010 | Barton | G06F 17/30817 706/11 |

(Continued)

OTHER PUBLICATIONS

Kanedera et al., "Subtopic Segmentation in the Lecture Speech", Ishikawa National College of Technology, 2004.*

(Continued)

*Primary Examiner* — Rehana Perveen
*Assistant Examiner* — Huen Wong
(74) *Attorney, Agent, or Firm* — Maschoff Brennan

(57) ABSTRACT

A method of identifying topics in lecture videos may include receiving lecture video metadata, learning courses metadata, and a lecture video transcript (transcript). The transcript may include transcribed text of a lecture video (video). The method may include discovering candidate learning courses related to the video based on a measured similarity between the video metadata and the learning courses metadata. The method may include extracting key phrases from learning materials of the candidate learning courses. The method may also include assigning weights to the extracted key phrases based on a position of the extracted key phrases and a frequency with which the extracted key phrases appear, and the discovered candidate learning course in which the key phrases appear. The method may include apportioning the video into topic-specific portions based on topic segments generated in the transcript, the presence of the extracted key phrases therein, and the assigned weights.

18 Claims, 13 Drawing Sheets

(56) References Cited

U.S. PATENT DOCUMENTS

| | | | |
|---|---|---|---|
| 2011/0112832 A1* | 5/2011 | Prorock | G11B 27/36 704/235 |
| 2012/0011109 A1 | 1/2012 | Ambwani et al. | |
| 2013/0021529 A1 | 1/2013 | Kim et al. | |

OTHER PUBLICATIONS

Lin et al., "Segmentation of Lecture Videos Based on Text: A Method Combining Multiple Linguistic Features", 2004, IEEE.*

Hearst, Marti A. "TextTiling: Segmenting text into multi-paragraph subtopic passages." Computational linguistics 23.1 (Mar. 1997): 33-64.

Riedl, Martin, and Chris Biemann. "Text Segmentation with Topic Models." The Journal for Language Technology and Computational Linguistics (Jun. 2012): 47-69.

Choi, Freddy YY. "Advances in domain independent linear text segmentation." Proceedings of the 1st North American chapter of the Association for Computational Linguistics conference. Association for Computational Linguistics, Apr. 2000.

Eisenstein, Jacob, and Regina Barzilay. "Bayesian unsupervised topic segmentation." Proceedings of the Conference on Empirical Methods in Natural Language Processing. Association for Computational Linguistics, Oct. 2008.

Yang, Haojin, Franka Gruenewald, and Christoph Meinel. "Automated Extraction of Lecture Outlines from Lecture Videos—A Hybrid Solution for Lecture Video Indexing." CSEDU (1). 2012.

Haojin Yang, Franka Grünewald, Matthias Bauer, Christoph Meinel, Lecture Video Browsing Using Multimodal Information Resources, Advances in Web-Based Learning—ICWL 2013, Lecture Notes in Computer Science vol. 8167, Oct. 2013, pp. 204-213.

Repp, S.; Gross, A.; Meinel, C., "Browsing within Lecture Videos Based on the Chain Index of Speech Transcription," Learning Technologies, IEEE Transactions on , vol. 1, No. 3, pp. 145,156, Jul.-Sep. 2008.

Yang, Haojin, Christoph Oehlke, and Christoph Meinel. "An automated analysis and indexing framework for lecture video portal." Advances in Web-Based Learning-ICWL 2012. Springer Berlin Heidelberg, Sep. 2012. 285-294.

Wang, Feng, Chong-Wah Ngo, and Ting-Chuen Pong. "Structuring low-quality videotaped lectures for cross-reference browsing by video text analysis." Pattern Recognition 41.10 (Oct. 2008): 3257-3269.

* cited by examiner

TOPIC IDENTIFICATION IN LECTURE VIDEOS

FIELD

The embodiments discussed herein are related to topic identification in lecture videos.

BACKGROUND

Open education generally refers to online learning programs or courses that are made publicly available on the Internet or other public access networks. Examples of open education programs may include e-learning programs, Open Courseware (OCW), Massive Open Online Courses (MOOC), and the like. Various universities and other educational institutions offer open education programs free-of-charge to the general public without imposing any academic admission requirements. Participation in an open education program typically allows a learner to access learning materials relating to a variety of topics. The learning materials may include lecture notes and/or lecture video recordings of a lecture by an instructor at the educational institution.

Various open education programs are currently offered by a number of educational institutions, including, among others, Massachusetts Institute of Technology, Yale, the University of Michigan, the University of California Berkeley, and Stanford University. The number of educational institutions offering open education programs has increased substantially since the inception of open education a little over a decade ago. With the proliferation of open education programs, there has been a concomitant increase in the number of available learning materials and the number of lecture videos available online. However, in some cases, learners have difficulties finding specific pieces of knowledge points or concepts wanted in lecture videos because of unstructured and linear features of lecture videos. For example, when the learners want to study or review a certain part of a lecture video, they often have to look through almost the entire video or even play back and forth several times to locate a right spot.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of identifying topics in lecture videos may include receiving lecture video metadata, learning courses metadata, and a lecture video transcript. The lecture video transcript may include transcribed text of a lecture video. The method may include discovering one or more candidate learning courses that are related to the lecture video based on a measured similarity between the lecture video metadata and the learning courses metadata. The method may include extracting key phrases from learning materials of the one or more candidate learning courses. The method may include assigning weights to the extracted key phrases based on a position of the extracted key phrases in the discovered learning materials, a frequency with which the extracted key phrases appear in the learning materials, and the candidate learning course in which the key phrases appear. The method may also include apportioning the lecture video into two or more topic-specific portions based on two or more topic segments generated in the lecture video transcript, the extracted key phrases, and the assigned weights of the extracted key phrases.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments discussed herein are generally related to topic identification in lecture videos (videos). After the topics are identified, the video may be apportioned into topic-specific portions. Learners may then efficiently search and browse the videos by topic. An example method includes discovering one or more candidate learning courses that are related to a video based on a similarity between a lecture video metadata and learning courses metadata. Key phrases may be extracted from learning materials of the one or more candidate learning courses. Weights may be assigned to the extracted key phrases based on a position of the extracted key phrases in the learning materials, a frequency with which the extracted key phrases appears in the learning materials, and the discovered candidate learning course in which the key phrases appear. The video may be apportioned into topic-specific portions based on topic segments generated in the lecture video transcript, the presence of the extracted key phrases within topic segments, and the assigned weights of the extracted key phrases. Labels may then be induced for the topic-specific portions and a keyword search for the video may be created. The video in an apportioned form may then be presented to learners. The learners may then select one of the topic-specific portions, which may advance the video to the selected topic-specific portion during which the topic is discussed. This and other embodiments are described with reference to the appended drawings.

Figure 1:
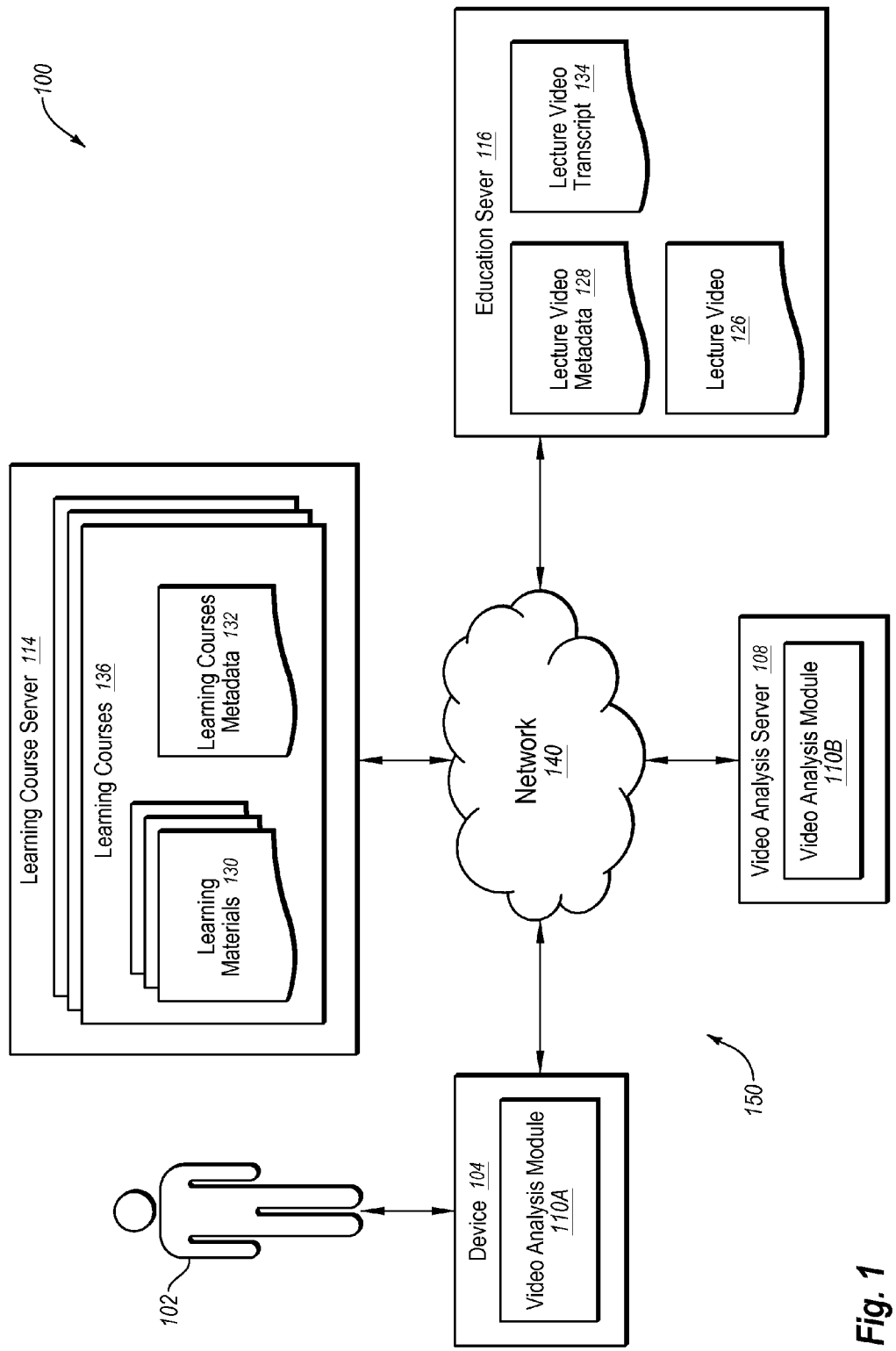
FIG. 1 illustrates a block diagram of an example operating environment in which some embodiments described herein may be implemented.

FIG. 1 illustrates a block diagram of an example operating environment 100 in which some embodiments described herein may be implemented. The operating environment 100 may include a video analysis system 150 that enables the apportionment of a video such as a lecture video (video) 126 into topic-specific portions. The apportionment of the video 126 may be based at least partially on a lecture video transcript (transcript) 134 of the video 126 and/or learning materials 130 of learning courses 136 that may be related to the video 126. After the video 126 is apportioned, a learner 102 may be able to watch portions of the video 126 related to a topic without watching the entire video 126. Additionally or alternatively, after the video 126 is apportioned, the learner 102 may be able to search the video 126 for a keyword. A portion of the video 126 that relates to the keyword may be communicated to the learner 102 or indicated in a user interface. The learner 102 may be able to watch the portion of the video 126 related to the keyword without watching the entire video 126.

In the depicted embodiment, the learner 102 may include any individual or entity that is interfacing with the video analysis system 150. The learner 102 may be associated with a device 104, which may enable interaction with the video analysis system 150 and/or the operating environment 100. In addition to the device 104, the operating environment 100 may include a learning course server 114, an education server 116, and a video analysis server 108. The device 104, the learning course server 114, the education server 116, and the video analysis server 108 may communicate via a network 140. For example, the device 104, the third party server 106, and the video analysis server 108 may communicate the learning materials 130 via the network 140. In some embodiments the learning course server 114 and the education server 116 may be included in a single server, which may include an open educational resource (OER) server. Additionally, in some embodiments one or more some items (e.g., 136, 130, and 132) included in the learning course server 114 may be included in the education server 116 or some items (e.g. 128, 134, and 126) included in the education server 116 may be included in the learning course server 114. For example, the video 126 may be an example of the learning materials 130.

Additionally, the device 104 may include a video analysis module 110A and/or the video analysis server 108 may include a video analysis module 110B. When referring to the video analysis modules 110A and/or 110B the video analysis modules 110 are used herein. The video analysis modules 110 may be configured to apportion the video 126. The video analysis modules 110 may further enable communication of the information such as the learning materials 130, learning course metadata 132, the learning courses 136, lecture video metadata 128, the transcript 134, the video 126, and information related thereto between the device 104, the video analysis server 108, the education server 116, and the learning course server 114 via the network 140.

The network 140 may be wired or wireless, and may have numerous different configurations including, but not limited to, a star configuration, a token ring configuration, or other configurations. Furthermore, the network 140 may include a local area network (LAN), a wide area network (WAN) (e.g., the Internet), and/or other interconnected data paths across which multiple devices may communicate. In some embodiments, the network 140 may include a peer-to-peer network. The network 140 may also be coupled to or include portions of a telecommunications network that may enable communication of data in a variety of different communication protocols.

In some embodiments, the network 140 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

The device 104 may include a computing device that includes a processor, memory, and network communication capabilities. For example, the device 104 may include a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 140.

The device 104 may include the video analysis module 110A. The video analysis module 110A or a portion thereof installed on the device 104 may be configured to enable interaction with the learner 102. For example, the video analysis module 110A may be configured to provide a user interface that allows the learner 102 to access the video 126 following apportionment of the video 126. The learner 102 may view the video 126 or a portion thereof in an apportioned form and/or search for keywords in the video 126 via the video analysis module 110A. In some embodiments, the device 104 may not include the video analysis module 110A. In these and other embodiments, the device 104 may be used by the learner 102 to interface with the video analysis module 110B via a browser.

The learning course server 114 may include a hardware server that includes a processor, memory, and communication capabilities. In the illustrated embodiment, the learning course server 114 may be coupled to the network 140 to send and receive data to and from the device 104, the video analysis server 108, and the education server 116 via the network 140. The learning course server 114 may be configured to host and/or store the learning courses 136. The learning courses 136 may include academic courses or seminars, for instance.

The learning courses 136 may include the learning materials 130. For example, the learning materials 130 may include, but are not limited to, a syllabus, notes, an outline, example problems and/or solutions, a lecture note list, lecture videos, other videos, video transcripts, or some other similar learning materials for the learning courses 136. The learning courses 136 may also include the learning course metadata 132. The learning course metadata 132 may include metadata from the learning courses 136 and/or the learning materials 130 included therein. Some examples of the learning course metadata 132 may include, but are not limited to, a course title, a course number, a date or dates of the course, a professor, an institute, the syllabus, a title of one of the learning materials 130 such as the notes, and the text of the learning materials 130.

In some embodiments, the learning courses 136 in the learning course server 114 may be selected from an OER. Additionally or alternatively, the learning courses 136 may be selected at least partially based upon the interests of the learner 102. Accordingly, in these and other embodiments, one or more of the learning courses 136 and/or the learning materials 130 may include open education materials such as an Open Courseware (OCW) course. In some embodiments, recommendation and/or selection of the open educational materials may be performed as described in U.S. patent application Ser. No. 13/731,996, filed Dec. 31, 2012, which is incorporated herein by reference in its entirety.

The education server 116 may include a hardware server that includes a processor, memory, and communication capabilities. In the illustrated embodiment, the education server 116 may be coupled to the network 140 to send and receive data to and from the device 104, the video analysis server 108, and the learning course sever 114 via the network 140. The education server 116 may be configured to host and/or store the video 126. The video 126 may be accessible to the device 104, the learning course server 114, and the video analysis server 108 via the network 140.

The education server 116 may also host and/or store the video 126, the lecture video metadata 128, and the transcript 134. The transcript 134 may include transcribed text of the video 126 correlated to time of the video 126. The lecture video metadata 128 may include data associated with the video 126. The data associated with the video 126 may include one or more of a title of the video 126, a title of a course to which the video 126 belongs or with which the video 126 is associated, a number of the course, a date or dates on which the video 126 is recorded and/or on which a corresponding lecture is presented, a professor or a lecturer that presents the corresponding lecture, an institute at which the corresponding lecture is presented or with which the professor is associated, a description of the video 126 and/or the corresponding lecture, and the transcript 134.

In some embodiments, the education server 116 may be associated with a university or similar educational institution. Additionally or alternatively, the education server 116 may include an OER server. The OER server may provide the video 126 to the learner 102 without the learner 102 being formally enrolled in a class.

The video analysis server 108 may include a hardware server that includes a processor, a memory, and network communication capabilities. In the illustrated embodiment, the video analysis server 108 may be coupled to the network 140 to send and receive data to and from the device 104, the learning course server 114, and/or the education server 116 via the network 140. The video analysis server 108 may include the video analysis module 110B. The video analysis module 110B may be configured to analyze the video 126. Additionally or alternatively, the video analysis module 110B may be configured to interact with the video analysis module 110A to analyze the video 126 and/or provide the video 126 in an apportioned form to the learner 102.

In the following paragraphs, an example apportionment of the video 126 is described. Although both of the video analysis modules 110 are described herein as performing the same operations, alternately or additionally, the video analysis module 110A may perform some of the operations, while the video analysis module 110B performs others of the operations. For example, in some embodiments, the video analysis module 110B may perform the majority of the operations described below, which the video analysis module 110A in the device 104 enables access by the learner 102 to the video 126 in an apportioned form. In some embodiments, the device 104 may include the video analysis module 110A that may be configured to perform the majority of the operations.

In some embodiments, the video analysis modules 110 may be configured to receive the transcript 134, the lecture video metadata 128, the learning materials 130, and the learning course metadata 132. For example, the video analysis modules 110 may receive the transcript 134, the lecture video metadata 128, the learning course metadata 132, or any combination thereof from the education server 116 and the learning course server 114 via the network 140. Additionally or alternatively, the video analysis modules 110 may access the transcript 134, the lecture video metadata 128, the learning materials 130 of the learning courses 136, the learning course metadata 132, or any combination thereof from the education server 116 and the learning course server 114 via the network 140.

The video analysis modules 110 may discover one or more candidate learning courses from among the learning courses 136 that are related to the video 126. The discovery may be based on a measured similarity between the lecture video metadata 128 and the learning course metadata 132. The measured similarity may include, but is not limited to exact matches between certain metadata, determination of whether certain metadata is available, and text similarities between certain metadata. In some embodiments, the measure similarity may be quantified in a match score.

For example, the video analysis modules 110 may calculate a match score for the learning courses 136. The match scores may be based on the lecture video metadata 128 and the learning course metadata 132 of each of the learning courses 136. In some embodiments, the match scores may be calculated in part by computing text similarities and in part by determining availabilities and matches for one or more metadata categories. The metadata categories may include, but are not limited to, video title/lecture note title, course title, course number, date, professor or lecturer, institute, video description/syllabus, and video transcript/lecture notes text. The video analysis modules 110 may assign weights to each of the metadata categories. The video analysis modules 110 may then sum products of the assigned weights and the computed text similarities.

In this and other embodiments, the match score may be calculated according to a match score equation:

$$\text{Match\_Score} = a^*VT + b^*CT + c^*CN + d^*D + e^*L + f^*I + g^*DS + h^*TL$$

In the match score equation, the quantity Match_Score represents the match score of one of the learning courses 136 with respect to the video 126. The variable VT represents the text similarity score for the video title/lecture note title metadata category. The variable VT represents a selected highest text similarity score between the video title/lecture note title metadata. The variable CT represents the text similarity score for the course title metadata category. The variable CN represents a score for the course number metadata category indicating whether a course number is available and if the course number is available, whether the course numbers in the metadata match. For example if the course number is available and matches, then CN may be equal to one. Otherwise, CN may be equal to zero.

The variable D represents a match between date metadata. For example, if dates are available in the metadata, then D may be calculated according to an date similarity equation:

$$D = \exp^{-\lambda |video\_data - course\_date|}$$

In the date similarity equation, exp represents the exponential function. The parameter represents a constant. The parameter video_date represents a date of a video. The parameter course_date represents a date of a course. If the dates are not available, D may be equal to zero. Dates may be calculated in terms of year.

The variable L represents the text similarity score for the professor or lecturer metadata category. If the professor or lecturer is not available, the variable L may be equal to zero. The variable I represents a match score for the institute metadata category. If the institute metadata is available and matches, then I may be equal to one, if not, then I may be equal to zero. The variable DS represents the text similarity score for the video description/syllabus metadata category. If metadata in the video description/syllabus metadata category is not available, then DS may be equal to zero. The variable TL represents the text similarity score for the video transcript/lecture notes text metadata category. In some embodiment, to determine TL, a text similarity score may be calculated between video transcript and full text of each lecture note. TL may represent the highest of the text similarity scores.

The variables a, b, c, d, e, f, g, and h represent assigned weights. The assigned weights may be adjusted based on relative importance of each of the metadata categories. In some embodiments, the values of the assigned weights may be set ad hoc. Additionally or alternatively, the assigned weights may be changed or optimized using machine learning. Additionally or alternatively, the sum of the assigned weights may be equal to 1. For instance, in an example embodiment, the values of the variables a, b, c, d, e, f, g, and h may include a=0.2, b=0.4, c=0.1, d=0.05, e=0.05, f=0.05, g=0.1, and h=0.1. In some embodiments, a vector space model (VSM) may be used to calculate the text similarity. Some additional details of VSM are provided elsewhere herein.

The video analysis modules 110 may determine whether each of the match scores is above a particular match score threshold. In response to the match score of one of the learning courses 136 being above the particular match score threshold, the video analysis modules 110 may select the learning courses 136 as a candidate learning course. In response to the match score being below the particular match score threshold, the video analysis modules 110 may not select the learning courses 136 as a candidate learning course. The match score threshold may depend on values of the assigned weights and/or the algorithm used for the measured similarities. For instance if the assigned weights may be summed to equal one, the match score threshold may include a value between 0.5 and 1.

The video analysis modules 110 may then extract key phrases. The key phrases may include key topics and/or key concepts from the candidate learning courses. The key phrases may include phrases that appear in certain learning materials 130 and/or in certain locations of certain learning materials 130. Additionally or alternatively, the key phrases may include phrases that appear in the learning materials 130 frequently. For example, a phrase is more likely to be a key phrase when it is repeated multiple times.

The video analysis modules 110 may be configured to determine one or more characteristics of the phrases and designated a phrase as a key phrase or not a key phrase. For example, the video analysis modules 110 may use term frequency-inverse document frequency (TFIDF) to extract key phrases. Additionally or alternatively, the video analysis modules 110 may access the learning materials 130 of the one or more candidate learning courses. The video analysis modules 110 may detect positions of phrases in the learning materials 130 based on a text format analysis. The video analysis modules 110 may also extract repeated phrases using a generalized suffix tree.

The video analysis modules 110 may determine whether the phrases appear in a syllabus or a lecture note title. In response to the phrases appearing in the syllabus or the lecture note title, the video analysis modules 110 may designate the phrases as key phrases. In response to the phrases not appearing in the syllabus or the lecture note title, the video analysis modules 110 may determine whether the phrases appear in a section title or a page title. In response to the phrases not appearing in the section title or the page title, the video analysis modules 110 may designate the phrases as key phrases. In response to the phrases not appearing in the section title or the page title, the video analysis modules 110 may determine whether the phrases appear in the learning materials 130 above a particular frequency threshold (e.g., twice in the learning material). In response to the phrases not appearing in the learning materials 130 above a particular frequency threshold, the video analysis modules 110 may not designate the phrases as key phrases. In response to the phrases appearing in the learning materials 130 above a particular frequency threshold, the video analysis modules 110 may designate the phrases as key phrases.

Additionally or alternatively, the video analysis modules 110 may process stop words in the key phrases. Stop words may generally include words that are removed prior to analysis. Some examples of the stop words may include domain-specific words such as "lecture" or "notes" as well as general stop words such as "the," "and," or "a." Additionally, the video analysis modules 110 may extract and/or unify abbreviations using heuristic rules. An example of a heuristic rule may include a rule to extract a phrase followed by a parenthetical to determine whether the parenthetical includes an abbreviation or an acronym for the phrase.

Additionally or alternatively, the video analysis modules 110 may analyze the appearance position and generate a hierarchy of the key topics and the key concepts in the candidate learning courses based on the key phrases and the assigned weights.

The video analysis modules 110 may assign weights to the extracted key phrases. The weights may be assigned based on a position of the extracted key phrases in the learning materials 130. For example, a weight may be higher if the extracted key phrase appears in a title or heading. Additionally or alternatively, the weights may be assigned based on frequencies with which the extracted key phrases appear in the learning materials 130. For example, a weight may be higher if the extracted key phrase occurs above a particular threshold. Additionally or alternatively, the weights may be assigned based on the candidate learning course in which the key phrase appears, or some combination thereof. For example, if the key phrase appears in the discovered candidate learning course of the video 126, then the key phrases may be assigned a higher weight than key phrases that appear in other candidate learning courses.

Additionally in some embodiments, the video analysis modules 110 may determine whether the transcript 134 is generated by speech recognition. In response to the transcript 134 being generated by speech recognition, the video analysis modules 110 may refine the transcript 134 based on the extracted key phrases and/or the assigned weights. For example, the extracted key phrases may be used in a domain-specific dictionary. The domain specific dictionary may be used in with a speech recognition system to enhance the dictionary and accordingly improve accuracy of the transcript 134. Additionally or alternatively, the video analysis module 110 may unify the transcript 134 using heuristic rules.

The video analysis modules 110 may apportion the video 126 into topic-specific portions based on topic segments generated in the transcript, the presence of the extracted key phrases within topic segments, the assigned weights of the extracted key phrases, or some combination thereof. The topic segments generally refer to a block of transcribed text in the transcript 134.

In these and other embodiments, the video analysis modules 110 may update the tokenization of the transcript 134 using the extracted key phrases and the assigned weights. The tokenization generally refers to the way in which the transcribed text of the transcript 134 is broken up into words and phrases. Updating the tokenization may include ensuring the extracted key phrases are combined or otherwise analyzed together.

The topic segments may be created using sliding-window segmentation. In general the sliding-window segmentation may include constructing a refined vector representation of sliding windows created in the transcript. The video analysis modules 110 may then calculate similarity between the sliding windows and detect topic segment borders that correspond to the topics in the transcript 134. The video analysis modules 110 may generate the topic segments, which may each include a portion of the transcript 134 between two topic segment borders. Border sentences in which text similarities change (e.g., local or global minimums) may be set as topic segment borders. In the sliding-window segmentation, topic segment borders may move or may be adjusted based on the presence of the extracted key phrases and/or the assigned weights of the extracted key phrases. For instance, a text similarity score may reflect similarities related to the extracted key phrases and/or the weights assigned thereto.

For example, the transcript 134 may include forty-five sentences numbered one to forty-five. A window size may be set to five sentences and a step may be set to one sentence. Upon initiation of the sliding-window segmentation, a first window includes sentences 1 through 5, and a second window includes sentences 6 through 10. A text similarity analysis may then be performed between text included in the first window and text included in the second window. With the step being set to one, the first window may then be reconfigured to include sentences 2 through 6 and the second window may then be reconfigured to include sentences 7 through 11. Another text similarity analysis may then be performed between the reconfigured first window and the reconfigured second window. The first and second windows may then be reconfigured according to the step until all forty-five sentences have been included in the windows. If at sentences 14 and 26 text similarities change (e.g., local or global minimums), topic segment borders may be set at sentences 14 and 26.

As mentioned above, the topic segments may be generated using a similarity determination. The text similarity measurements may be based on VSM. For example, in some embodiments, the text similarities may be calculated according to an example VSM equation:

$$sim(b_1, b_2) = \frac{\sum_{t=1}^{n} \omega_{t,b_1} \omega_{t,b_2}}{\sqrt{\sum_{t=1}^{n} \omega_{t,b_1}^2 \sum_{t=1}^{n} \omega_{t,b_2}^2}}$$

In the VSM equation, the variable t represents an index ranging from 1, which represents a first term to the variable n, which represents a final term. Accordingly, variable t ranges over all the terms including extracted key phrases. The variable $b_1$ represents a first sliding window and $b_2$ represents a second sliding window. The quantity $sim(b_1,b_2)$ represents the similarity between the first topic window and the second topic window. The parameter $\omega_{t,b}$ represents an assigned weight to a term in one of the topic windows. For example, $\omega_{t,b1}$ represents an assigned weight to a term in the first sliding window.

One or more of the topic segments of the transcript 134 may be correlated to a topic-specific portion of the video 126. Specifically, in some embodiments, the transcript 134 may include the transcribed text that is correlated to the time in which the verbal recitation of the transcribed text occurred in the video 126. The topic segments may then be translated from the transcript 134 to the video 126 based on the time.

The video analysis modules 110 may also induce labels for the topics. The labels may be based on the extracted key phrases that are present in a topic segments. For example, the video analysis modules 110 may receive the topic segment borders, the extracted key phrases, and the assigned weights. Based on the topic segment borders, the video analysis modules 110 may segment the transcript 134 into multiple sub-documents that generally correlate to the topic segments. The video analysis modules 110 may then reconstruct the refined vector representation for each of the sub-documents. The video analysis modules 110 may update the assigned weights based on TFIDF in each of the multiple sub-documents. The video analysis modules 110 may select a candidate label based on the updated assigned weights for each of the multiple sub-documents. The video analysis modules 110 may determine whether each of the candidate labels is one of the extracted key phrases. In response to the candidate label being one of the key phrases, the video analysis modules 110 may select the candidate label as a label for the sub-document. In response to the candidate label not being one of the extracted key phrases, the video analysis modules 110 may identify the sub-document as off-topic.

Additionally or alternatively, the video analysis modules 110 may check hierarchical relationships between the labels for the sub-documents and candidate labels that appear in each sub-document. The video analysis modules 110 may merge labels and may divide labels based on the hierarchical relationships. The merging and dividing of the labels may be based on the hierarchical relationships between the labels for the sub-documents and candidate labels that appear in each of the sub-documents Additionally, in some embodiments, the video analysis modules 110 may correlate a keyword search with the apportioned video 126. For example, the extracted key phrases may be identified in each of the sub-documents and/or each of the topic segments. The video analysis modules 110 may provide a user interface that allows the learner 102 to enter a keyword search. The video analysis modules 110 may then indicate to the learner 102 in which portion(s) of the video 126 the keyword is discussed.

In some embodiments, the video 126 in an apportioned form may be presented to the learner 102 via the device 104. The video 126 in an apportioned form may include a topic time bar or other graphic element that indicates which topics occur during which portions of the video 126. The topic time bar may be correlated to the transcript 134. The labels may be provided for each portion. Additionally or alternatively, the portions of the video 126 in which a keyword exists may be indicated by the time bar and/or highlighted in the transcript 134 presented to the learner 102 in response to a keyword search. Accordingly, the learner 102 may select to watch only a portion of the video 126 based on a topic of the portion and/or based on a discussion of the keyword in the portion.

Modifications, additions, or omissions may be made to the operating environment 100 and/or the video analysis system 150 without departing from the scope of the present disclosure. Specifically, embodiments of the operating environment 100 depicted in FIG. 1 include one learner 102, one learning course server 114, one education server 116, and the video analysis system 150 that includes one device 104 and one video analysis server 108. However, the present disclosure applies to the operating environment 100 including one or more learners 102, one or more learning course servers 114, the video analysis system 150 that may include one or more devices 104 and one or more video analysis servers 108, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

The video analysis modules 110 may include code and routines for topic identification in lecture videos. In some embodiments, the video analysis modules 110 act in part as a thin-client application that may be stored on a computing device, such as the device 104, and in part as components that may be stored on the video analysis server 108, for instance. In some embodiments, the video analysis modules 110 may be implemented using hardware including a field-programmable gate array (FPGA) or an application-specific integrated circuit (ASIC). In some other instances, the video analysis modules 110 may be implemented using a combination of hardware and software.

Figure 2:
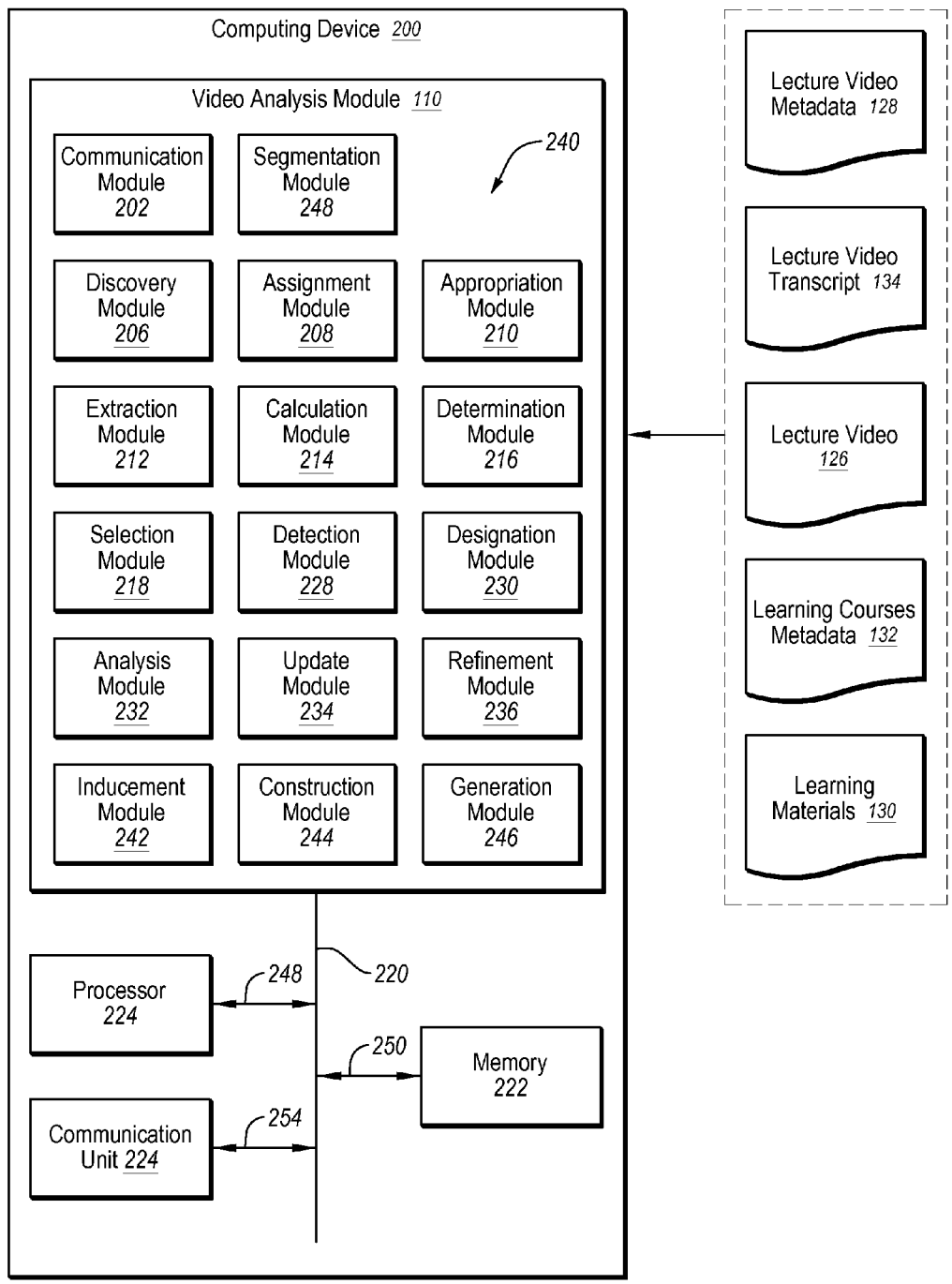
FIG. 2 is a block diagram of a computing device that may be implemented in the operating environment of FIG. 1.

Referring now to FIG. 2, an example of the video analysis module 110 is shown in more detail. The video analysis module 110 depicted in FIG. 2 may include one or more of the video analysis module 110A of the device 104 and/or of the video analysis module 110B of the video analysis server 108 of FIG. 1. FIG. 2 is a block diagram of a computing device 200 that includes the video analysis module 110, a processor 224, a memory 222, and a communication unit 226. The components of the computing device 200 may be communicatively coupled by a bus 220. In some embodiments, the computing device 200 may include the video analysis server 108 or the device 104 of the video analysis system 150 of FIG. 1. The video analysis module 110 is depicted including multiple modules 240 in a single computing device 200. In some embodiments one or more of the modules 240 may be loaded onto or otherwise stored on and used on multiple computing devices that may be substantially similar to the computing device 200. For example a subset of the modules 240 may be loaded onto the device 104 and another subset of the modules 240 may be loaded on the video analysis server 108.

With combined reference to FIGS. 1 and 2, the processor 224 may include an arithmetic logic unit (ALU), a microprocessor, a general-purpose controller, or some other processor array to perform computations and software program analysis. The processor 224 may be coupled to the bus 220 for communication with the other components (e.g., 110, 226, and 222). The processor 224 generally processes data signals and may include various computing architectures including a complex instruction set computer (CISC) architecture, a reduced instruction set computer (RISC) architecture, or an architecture implementing a combination of instruction sets. Although FIG. 2 includes a single processor 224, multiple processors may be included in the computing device 200. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may include a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from at least one of the learning course server 114, the education server 116, the device 104, and the video analysis server 108 depending upon where the video analysis module 110 is stored. The communication unit 226 may be coupled to the bus 220. In some embodiments, the communication unit 226 includes a port for direct physical connection to the network 140 or to another communication channel. For example, the communication unit 226 may include a USB, SD, CAT-5, or similar port for wired communication with the components of the operating environment 100. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a wired port and a wireless transceiver. The communication unit 226 may also provide other conventional connections to the network 140 for distribution of files and/or media objects using standard network protocols including transmission control protocol/internet protocol (TCP/IP), HTTP, HTTP secure (HTTPS), and simple mail transfer protocol (SMTP), etc. In some embodiments, the communication unit 226 includes a cellular communications transceiver for sending and receiving data over a cellular communications network including via SMS, MMS, HTTP, direct data connection, WAP, e-mail, or another suitable type of electronic communication.

In the embodiment of FIG. 2, the video analysis module 110 may include a communication module 202, a calculation module 214, a discovery module 206, an extraction module 212, a determination module 216, an assignment module 208, an apportionment module 210, a selection module 218, a detection module 228, a designation module 230, an analysis module 232, an update module 234, a refinement module 236, an inducement module 242, a generation module 246, a segmentation module 248, and a construction module 244 (collectively, the modules 240). Each of the modules 240 may be implemented as software including one or more routines configured to perform one or more operations. The modules 240 may include a set of instructions executable by the processor 224 to provide the functionality described herein. In some instances, the modules 240 may be stored in or at least temporarily loaded into the memory 222 of the computing device 200 and may be accessible and executable by the processor 224. One or more of the modules 240 may be adapted for cooperation and communication with the processor 224 and components of the computing device 200 via the bus 220.

The communication module 202 may be configured to handle communications between the video analysis module 110 and other components of the computing device 200 (e.g., 224, 222, and 226). The communication module 202 may be configured to send and receive data, via the communication unit 226, to the learning course server 114, the device 104, the education server 116, and the video analysis server 108. In some instances, the communication module 202 may cooperate with the other modules (e.g., 204, 206, 208, 210, 212, 214, 216, 218, 228, 230, 232, 234, 236, 238, 242 and 248) to receive and/or forward, via the communication unit 226, data from one or more of the learning course server 114, the device 104, the education server 116, and the video analysis server 108.

For example, the communication module 202 may be configured to receive and/or access the transcript 134, the video metadata 128, the learning course metadata 132, or any combination thereof from the learning course server 114 and/or the education server 116. The communication module 202 may communicate the lecture video metadata 128 and the learning course metadata 132 to the discovery module 206. The communication module 202 may communicate the transcript 134 to the apportionment module 210.

The discovery module 206 may be configured to discover one or more candidate learning courses. The candidate learning courses may include one or more of the learning courses 136 that are related to the video 126. The discovery module 206 may base the relatedness on a similarity between the lecture video metadata 128 and the learning course metadata 132. In some embodiments, the discovery module 206 may coordinate with the calculation module 214, the determination module 216, the assignment module 208, and the selection module 218 to discover the one or more candidate learning courses.

For example, the calculation module 214 may be configured to calculate a match score for one or more of the learning courses 136. The calculation module 214 may calculate the match scores based on the lecture video metadata 128 and the learning course metadata 132. In some embodiments, the calculation module 214 may compute measured similarities based text similarities, availability of certain metadata, and on matches between certain metadata. The text similarities included in the measured similarities and/or the match scores may be based on a VSM in some embodiments.

The assignment module 208 may be configured to assign weights to the metadata categories and/or key phrases. For example, the assignment module 208 may assign weights to each of the metadata categories. The weights may reflect a relative importance of each of the metadata categories. The assignment module 208 may communicate the weights of each of the metadata categories to the calculation module 214. To calculate the match score of one or more of the learning courses 136, the calculation module 214 may sum the products of the assigned weights and the computed scores (e.g., a linear combination). The calculation module 214 may communicate the match scores to the determination module 216.

The determination module 216 may be configured to determine whether each of the match scores is above a particular match score threshold. In response to the match score being above the particular match score threshold, the determination module 216 may communicate a signal to the selection module 218 indicating that the match score of one of the learning courses 136 is above the particular match score threshold. In response to the match score being below the particular match score threshold, the determination module 216 may communicate a signal to the selection module 218 indicating that the match score of one of the learning courses 136 is below the particular match score threshold.

The selection module 218 may be configured to select the learning courses 136 as a candidate learning course in response to the match score being above the particular match score threshold and to not select the learning courses 136 as a candidate learning course in response to the match score being below the particular match score threshold.

The candidate learning courses may be communicated to the extraction module 212. The extraction module 212 may be configured to extract key phrases of key topics and key concepts from the learning materials 130 of the one or more candidate learning courses. In some embodiments, the extraction module 212 may coordinate the communication module 202, the detection module 228, the determination module 216, and the designation module 230 to extract the key phrases.

The communication module 202 may access the learning materials 130 of the one or more candidate learning courses and may communicate the learning materials 130 to the detection module 228 and the extraction module 212. The detection module 228 may be configured to detect positions of phrases in the learning materials 130 based on a text format analysis. Additionally, the extraction module 212 may extract repeated phrases using a generalized suffix tree. The phrases may be communicated from the extraction module 212 and the detection module 228 to the determination module 216.

The determination module 216 may be configured to determine one or more characteristics of the phrases and communicate a signal indicating the characteristic to the designation module 230. Based on the signal from the determination module 216, the designation module 230 may either designate a phrase as a key phrase or not a key phrase.

For example, the determination module 216 may determine whether the phrases appear in a syllabus or a lecture note title. In response to the phrases appearing in the syllabus or the lecture note title, the designation module 230 may designate the phrases as key phrases. In response to the phrases not appearing in the syllabus or the lecture note title, the determination module 216 may determine whether the phrases appear in a section title or a page title. In response to the phrases appearing in the section title or the page title, the designation module 230 may designate the phrases as key phrases. In response to the phrases not appearing in the section title or the page title, the determination module 216 may determine whether the phrases appear in the learning materials 130 above a particular frequency threshold. In response to the phrases not appearing in the learning materials 130 above a particular frequency threshold, the designation module 230 may not designate the phrases as key phrases. In response to the phrases appearing in the learning materials 130 above a particular frequency threshold, the designation module 230 may designate the phrases as key phrases. Additionally, in some embodiments, the extraction module 212 may process stop words and extract and/or unify abbreviations using heuristic rules in the key phrases. The key phrases may be communicated to the assignment module 208.

The assignment module 208 may be configured to assign weights to the extracted key phrases. In some embodiments, the assignment module 208 may assign weights to the extracted key phrases based on a position of the extracted key phrases in the learning materials 130, a frequency with which the extracted key phrases appear in the learning materials 130, the discovered candidate learning courses 136 in which the key phrase appears, or some combination thereof. The assigned weights and the extracted key phrases may be communicated to the analysis module 232 and the apportionment module 210.

In some embodiments, the analysis module 232 may be configured to analyze the appearance position of the extracted key phrases. Additionally, based on the extracted key phrases and the weights assigned to the extracted key phrases, the analysis module 232 may generate a hierarchy of the key topics and the key concepts in the candidate learning courses.

Additionally, in some embodiments, the refinement module 236 may be configured to refine the transcript 134. For example, the determination module 216 may determine whether the transcript 134 is generated by auto speech recognition. In response to the transcript 134 being generated by auto speech recognition, the refinement module 236 may refine the transcript 134. The refinement may be based on the extracted key phrases and the assigned weights.

The apportionment module 210 may be configured to apportion the video 126 into two or more topic-specific portions. The apportionment module 210 may apportion the video 126 based on topic segments generated in the transcript 134, the presence of the extracted key phrases within two or more topic segments, and/or based on the assigned weights of the extracted key phrases. The two or more topic-specific portions may generally correspond to topic segments of the transcript 134.

In some embodiments, the apportionment module 210 may coordinate with the update module 234, the construction module 244, the calculation module 214, and the generation module 246 to apportion the video 126. For example, the update module 234 may be configured to update the tokenization of the transcript 134 using the extracted key phrases and the assigned weights. The construction module 244 may then construct a refined vector representation of sliding windows. The sliding windows move step by step in the transcript 134 to another to find topic segment borders, based on the refined vector representation.

The calculation module 214 may calculate similarity between the sliding windows. The detection module 228 may detect topic segment borders that may correspond to changes of the topics reflected by changes in the calculated text similarities included in the transcript 134. The generation module 246 may then generate the topic segments including a portion of the transcript 134 between two topic segment borders.

In some embodiments, the inducement module 242 may be configured to induce a label for one or more of the topic-specific portions based on the extracted key phrases present in the topic segments. For example, the inducement module 242 may coordinate with the communication module 202, the segmentation module 248, the construction module 244, the update module 234, the selection module 218, and the determination module 216 to induce labels for the topic-specific portions of the video 126. For example, the communication module 202 may be configured to receive the topic segment borders, the extracted key phrases, and the assigned weights. Based on the detected topic segment borders, the segmentation module 248 may be configured to segment the transcript 134 into multiple sub-documents. The construction module 244 may then reconstruct refined vector representations for each of the multiple sub-documents. The update module 234 may then update assigned weights of the key phrases in each of the multiple sub-documents based on TFIDF. The selection module 218 may select a candidate label based on the updated assigned weights for each of the multiple sub-documents and communicate the candidate labels to the determination module 216.

The determination module 216 may be configured to determine whether each of the candidate labels is one of the extracted key phrases. The determination module 216 may then communicate a signal indicating whether each of the candidate labels is one of the extracted key phrases to the selection module 218. In response to the candidate label being one of the extracted key phrases, the selection module 218 may select the candidate label as a label for the sub-document. In response to the candidate label not being one of the extracted key phrases, the selection module 218 may identify the sub-document as off-topic.

In some embodiments, the inducement module 242 may be configured to check hierarchical relationships between the labels for the sub-documents and candidate labels that appear in each sub-document. Based on the hierarchical relationships between the labels, the inducement module 242 may merge labels of one or more of the sub-documents or divide labels of one or more of the sub-documents.

Additionally, in some embodiments, the apportionment module 210 may be configured to correlate a keyword search with one or more portions of the video 126. The keyword search may be based upon the presence of phrases in the transcript 134, which may be detected as described herein.

Figure 3:
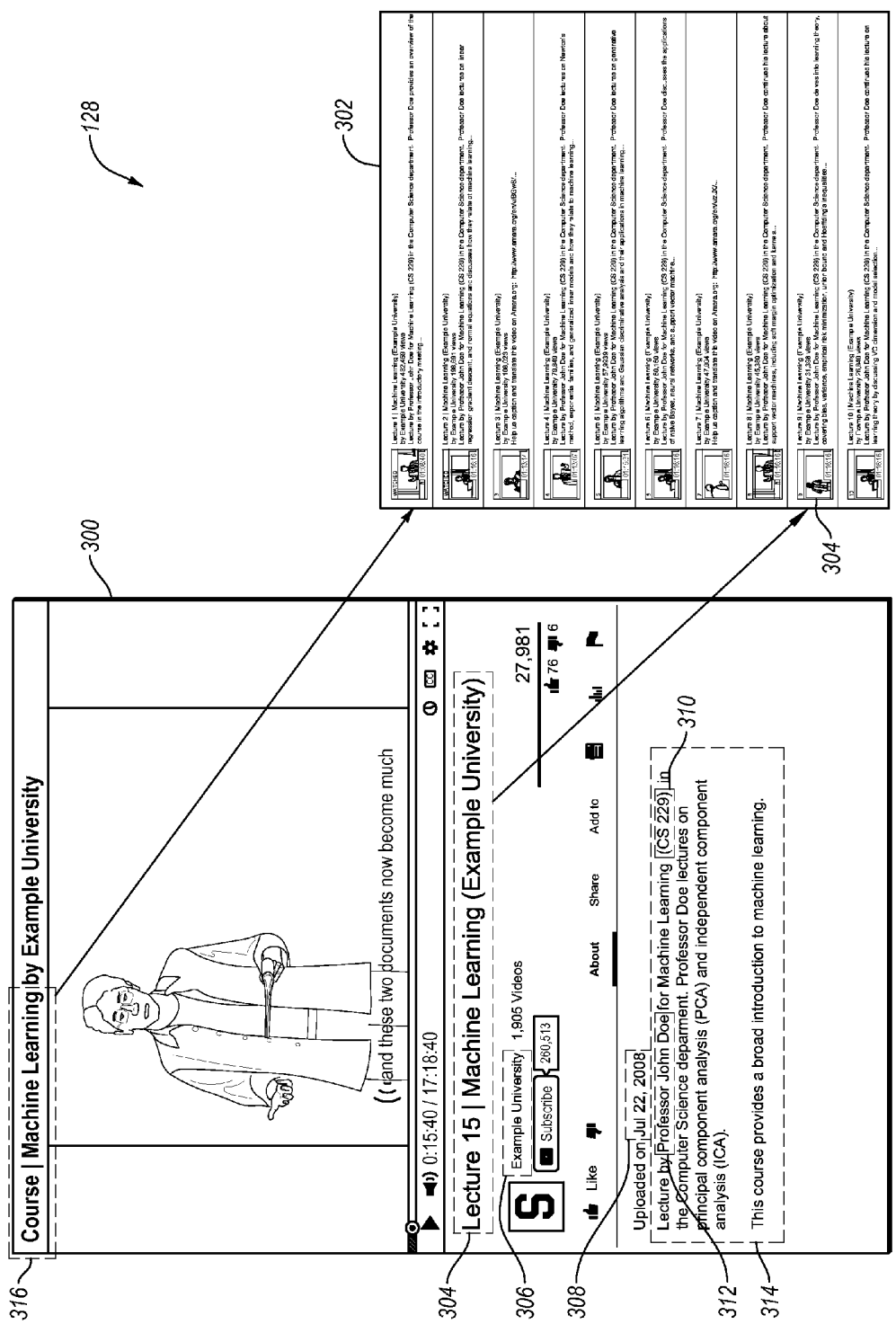
FIG. 3 illustrates example video metadata that may be included in the operating environment of FIG. 1.

FIG. 3 illustrates an example of the lecture video metadata 128 that may be included in the operating environment 100 of FIG. 1. Specifically, FIG. 3 includes a first screenshot 300 of an example video and a second screenshot 302 of a list of videos. In the first screenshot 300, examples of the lecture video metadata 128 are visible; for example, a video title 304, an institution 306, a date 308, a professor 312, a course number 310, and a description 314. Additionally, the first screenshot 300 may include a course title 316, which may be correlated to the list of videos depicted in the second screenshot 302. The video title 304 may also appear in the second screenshot 302 along with other videos in the list of videos.

Figure 4:
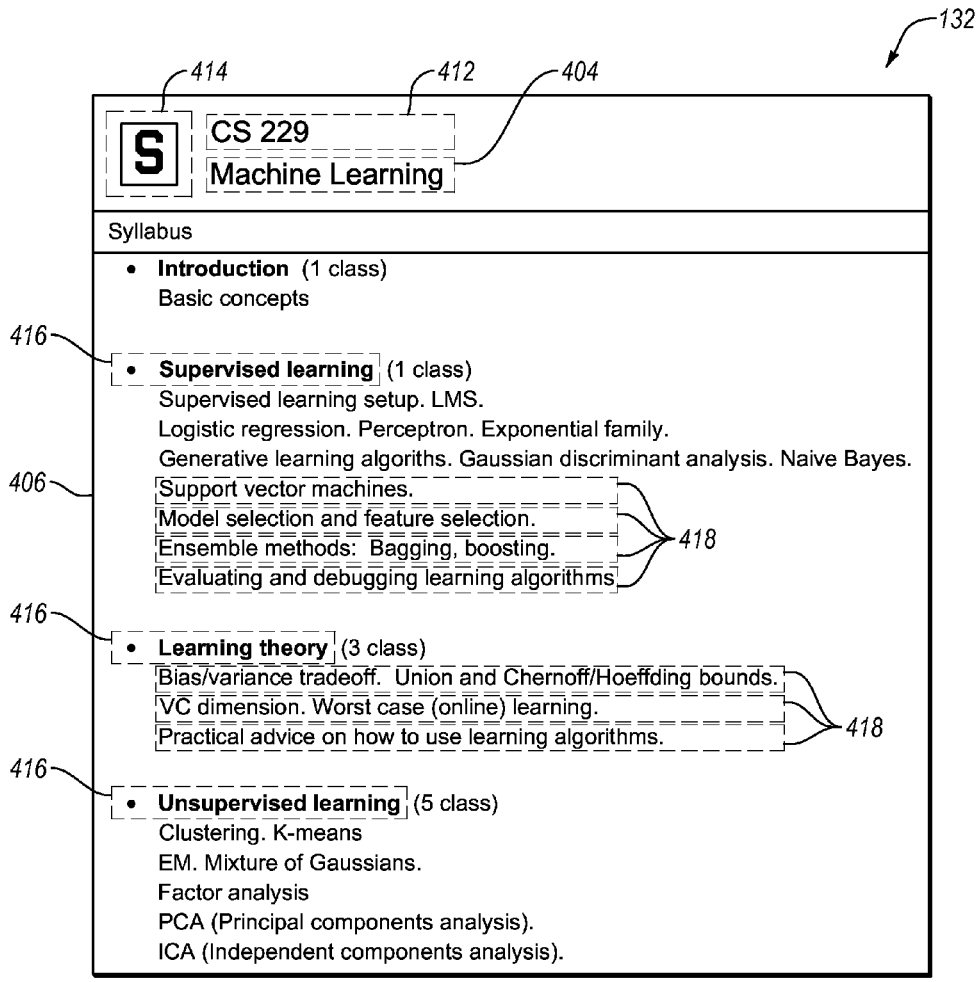
FIG. 4 illustrates example lecture course metadata that may be included in the operating environment of FIG. 1.
Figure 4:
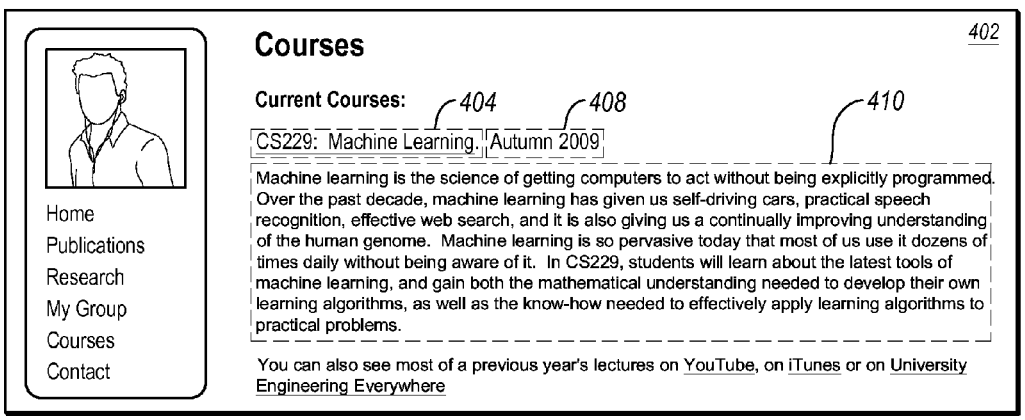

FIG. 4 illustrates an example of the learning course metadata 132 that may be included in the operating environment 100 of FIG. 1. The learning course metadata 132 may be found, for example, in a syllabus 406 and a course webpage 402. The learning course metadata 132 may include a course title 404, a date 408, a description 410, a course number 412, an institution 414, one or more main topics 416, and one or more subtopics 418. In FIG. 4, not all of the subtopics 418 are labeled.

With combined reference to FIGS. 1, 3, and 4, the video analysis modules 110 may be configured to calculate the match scores for one or more of the learning courses 136 based on the lecture video metadata 128 and the learning course metadata 132. Calculating the match scores may include calculating a measured similarity, which may include text similarities of certain metadata, availability of certain metadata, and matches between certain metadata, on one or more metadata categories. For example, the metadata categories may include, among others, a course number category, a title category, an institution category, and a date category. Accordingly, the video analysis modules 110 may match the course number 310 of FIG. 3 and the course number 412 of FIG. 4, match the title 304 of FIG. 3 with the title 404 of FIG. 4, match the date 308 of FIG. 3 and the date 408 of FIG. 4, etc. The video analysis module 110 may then perform a linear combination to calculate a match score.

Figure 5:
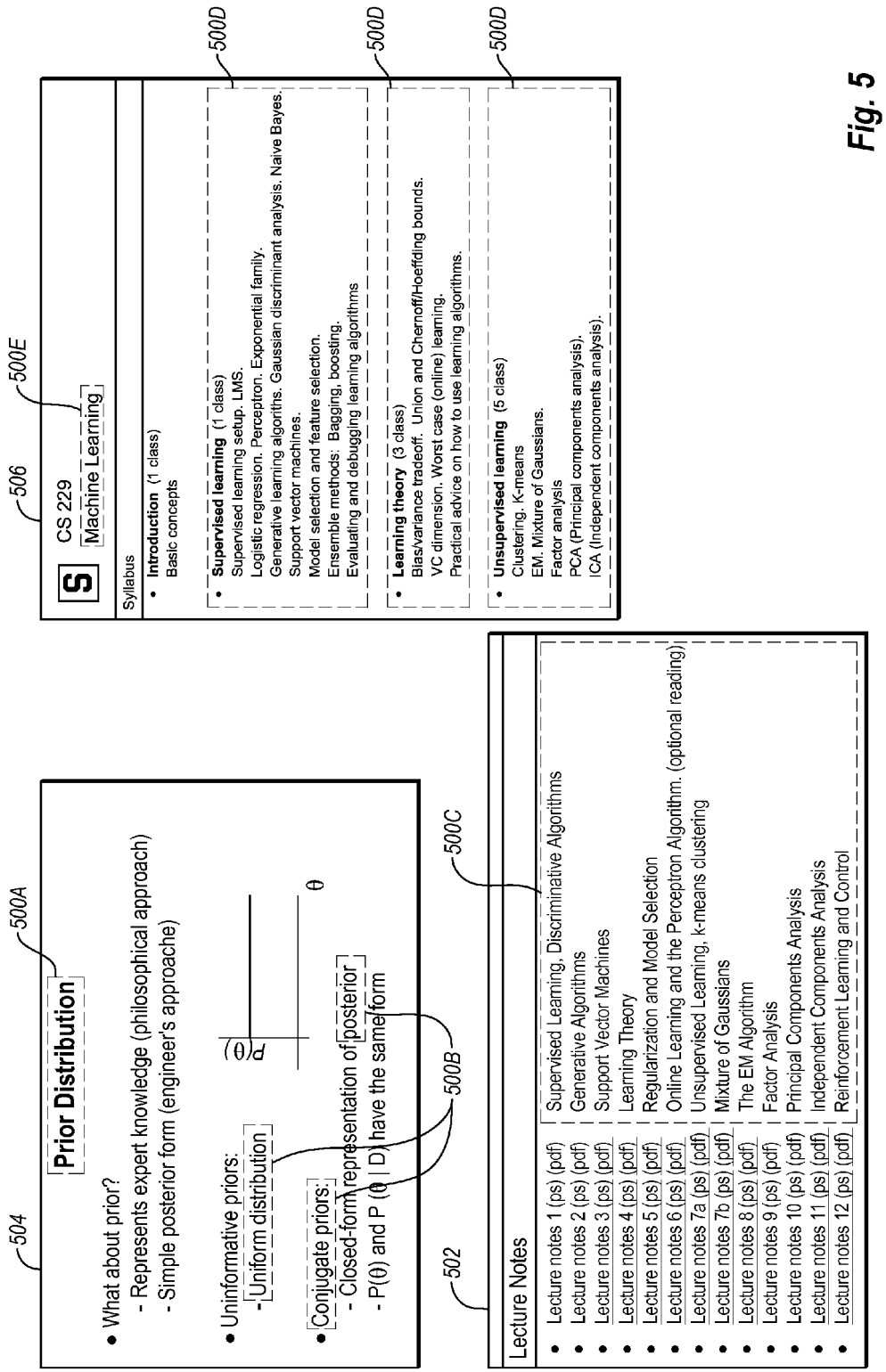
FIG. 5 illustrates examples of key phrases that may be extracted from learning materials in the operating environment of FIG. 1.

FIG. 5 illustrates examples of key phrases 500A-500E that may be extracted from the learning materials 130 of the operating environment of FIG. 1. The key phrases 500A-500E may be extracted from the learning materials 130 that may include slides in lecture notes 504, a lecture note list 502, and a syllabus 506, for instance. The key phrases 500A-500E may include phrases that appear in the learning materials 130. For example, a key phrase 500A may include a title of the lecture notes 504. Additionally, key phrases 500B may include terms or phrases in the lecture notes 504. Additionally, key phrases 500C may include titles of lectures in the lecture note list 502. Additionally, key phrases 500D may include the terms or phrases in the syllabus 506. Additionally, a key phrase 500E may include the title of the syllabus 506.

Figure 6:
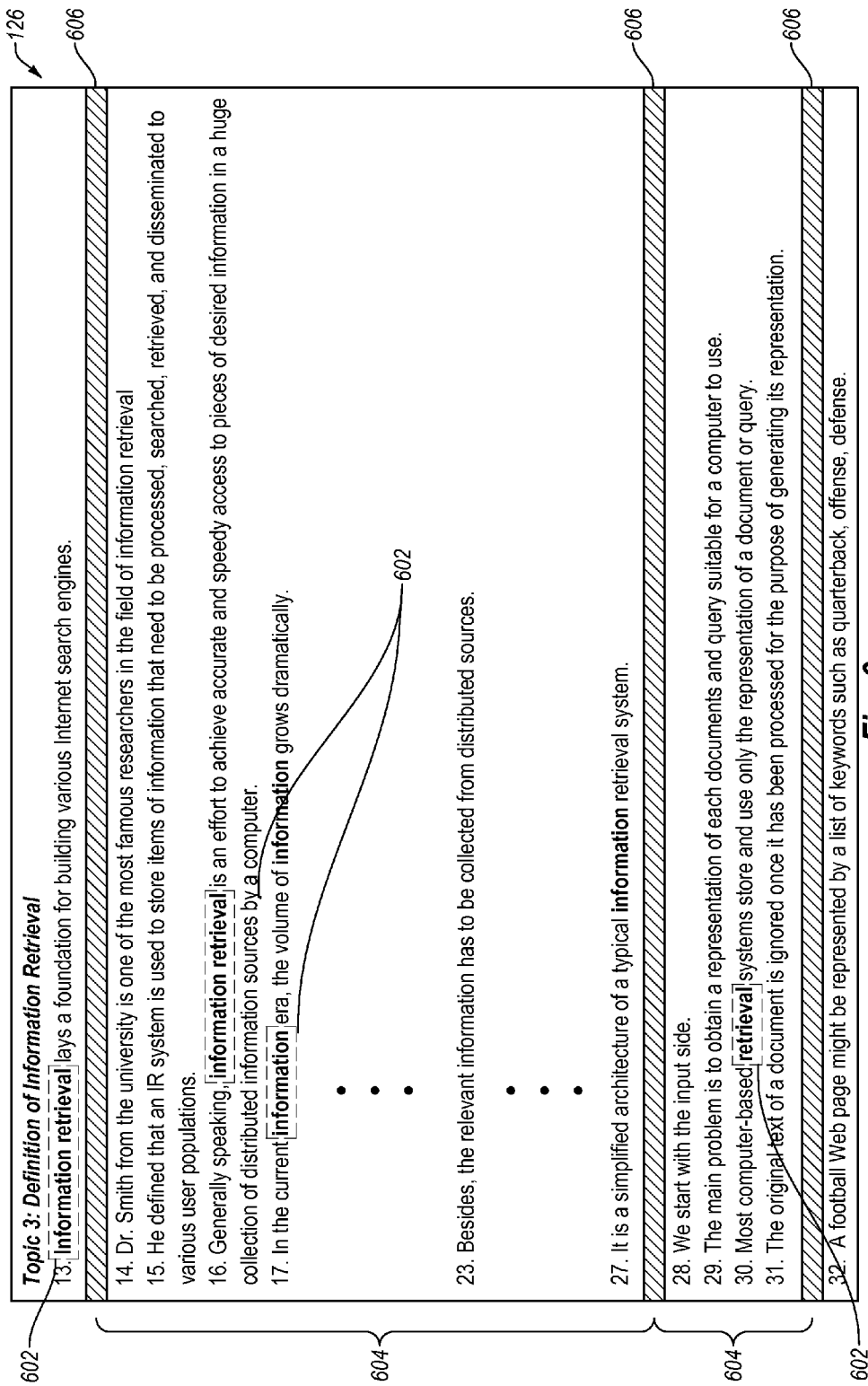
FIG. 6 illustrates an example lecture video transcript that may be included in the operating environment of FIG. 1.

FIG. 6 illustrates an example transcript 134 that may be implemented in the operating environment 100 of FIG. 1. The transcript 134 may include multiple extracted key phrases 602. The key phrases 602 are additional examples of key phrases similar to the key phrases 500A-500E of FIG. 5. The multiple extracted key phrases 602 may be used to identify one or more topic segments 604 that may be separated by topic segment borders 606. The multiple extracted key phrases 602 may also be used to induce labels for topics of each of the topic segments 604. Although not illustrated in FIG. 6, the transcript 134 may include timestamps, e.g., for each of one or more lines of the transcript 134, or may otherwise be correlated to elapsed time of the corresponding video to allow identification of the start and/or stop time of each of the topic windows 604 in the corresponding video.

Figure 7A:
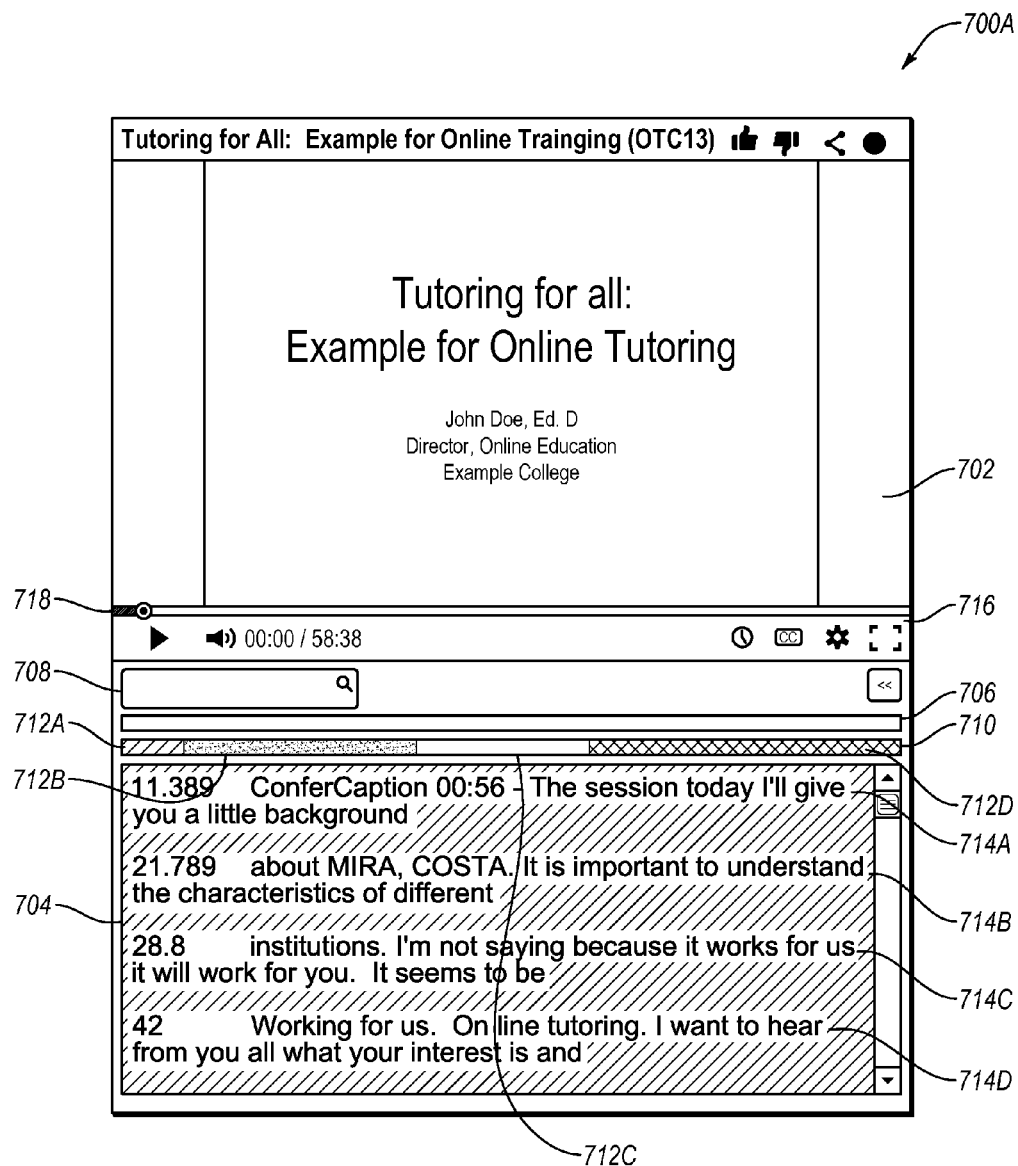
FIGS. 7A and 7B illustrate screenshots of an example lecture video in an apportioned form that may be provided in the operating environment of FIG. 1.
Figure 7B:
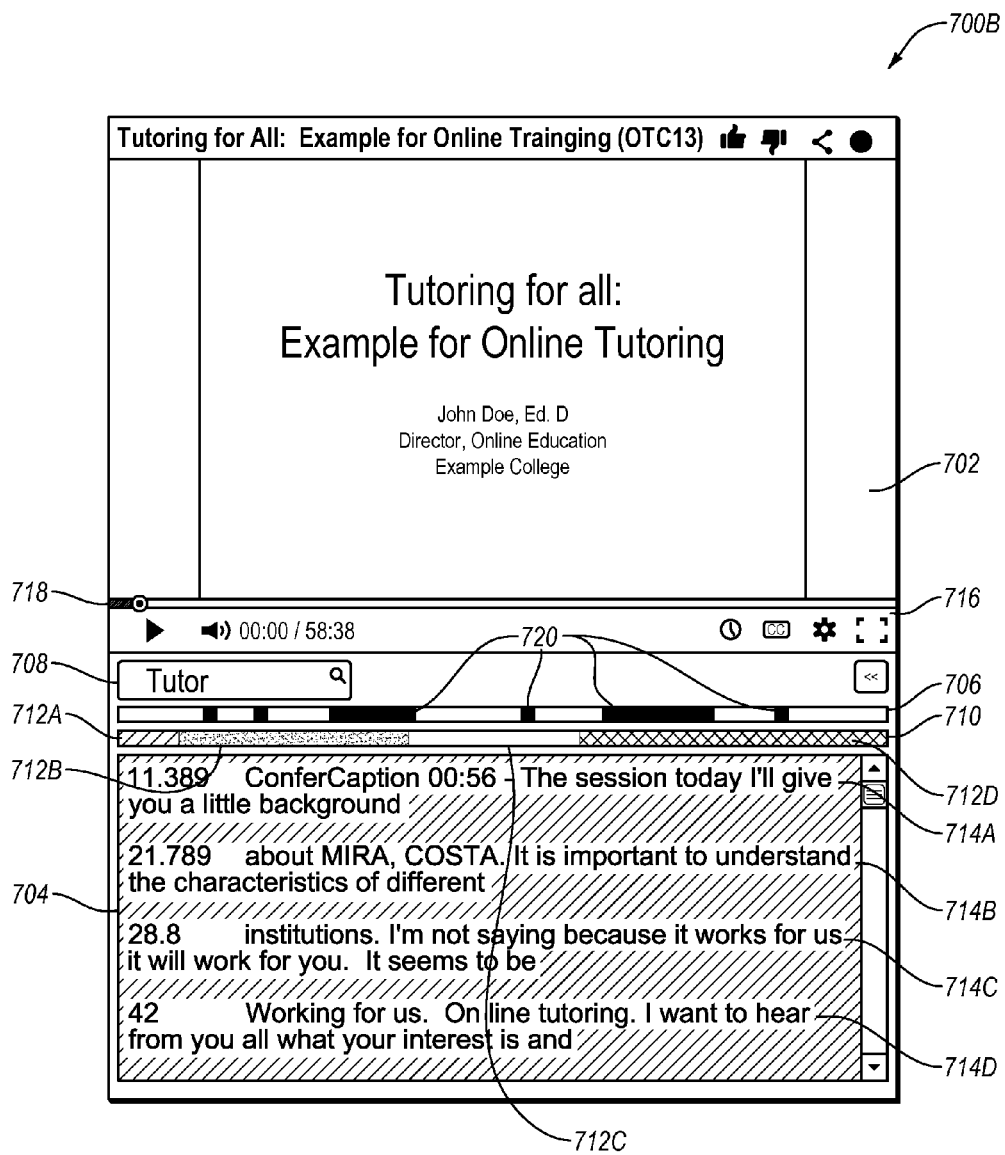

FIGS. 7A and 7B illustrate screenshots 700A and 700B (generally, screenshot 700 or screenshots 700) of an example of the video 126 in its apportioned form that may be provided in the operating environment 100 of FIG. 1. A first screenshot 700A depicts the video 126 in its apportioned form prior to receiving a keyword search query. A second screenshot 700B depicts the video 126 in its apportioned form in response to a keyword search.

With combined reference to FIGS. 7A and 7B, the screenshots 700 may include a video portion 702 in which the video 126 may be displayed or played. The screenshots 700 may also include a transcript portion 704 in which portions 714A-714D of a transcript may be displayed. Between the video portion 702 and the transcript portion 704, the screenshots 700 may include an elapsed time bar 716 and a topic time bar 710. The elapsed time bar 716 may enable a learner such as the learner 102 to advance or reverse the video 126. As the video 126 plays, an icon 718 may progress along the elapsed time bar 716, generally, a total time of the video 126 related to a length of the elapsed time bar 716. Thus, when half of the video 126 has been played, the icon 718 may be located about halfway across the length of the elapsed time bar 716. The elapsed time bar 716 may be included in some video playing applications such as YOUTUBE®.

The topic time bar 710 may be separated into two or more fragments 712A-712D. The fragments 712A-712D may correspond to topic-specific portions into which the video 126 is apportioned. Additionally, lengths of each of the fragments 712A-712D may correspond to a part of the elapsed time bar 716 during which the video 126 discusses each of the topics. For example, a first fragment 712A of the topic time bar 710 may have a first length and may correspond to a first topic. Accordingly, the first topic may be discussed in the video 126 during a first length of the elapsed time bar 716 that corresponds in duration to the first length of the topic time bar 710.

In this and other embodiments, the fragments 712A-712D may also correspond to one or more of the text segments 714A-714D of the transcript displayed in the transcript portion 704. For example, the first fragment 712A may correspond to a first segment 714A of the transcript. The first segment 714A of the transcript may include a label for the topic and/or a time in which the topic discussed in the video 126 changes. Additionally, in some embodiments, a learner may select the fragments 712A-712D. In response the label may be presented in a dropdown window.

Additionally, the screenshots 700 may include a search time bar 706 and a search field 708. In the first screenshot 700A the search field 708 may be empty and the search time bar 706 may be empty. Referring to FIG. 7B, the second screenshot 700B depicts an example search time bar 706 following a keyword query. In this and other embodiments, a keyword "tutor" may be entered into the search field 708. In response, the search time bar 706 may include one or more keyword indication blocks 720. The keyword indication blocks 720 may indicate portions of the video 126 during which the keyword (e.g., "tutor") is discussed. In some embodiments, by selecting the portions of the topic time bar 710 and/or the segments of the transcript 714A-714D, the video 126 may advance to or reverse to the portion of the video 126 discussing the topic.

The screenshots 700A and 700B depict an example embodiment. In some embodiments, the transcript portion 704 may be located on a side of the video portion 702 or may be omitted. Additionally or alternatively, one or more of the search time bar 706, the elapsed time bar 716, the topic time bar 710, any combination thereof, or any of the functionalities described with respect to any of the search time bar 706, the elapsed time bar 716, or the topic time bar 710 may be combined and/or omitted.

Figure 8:
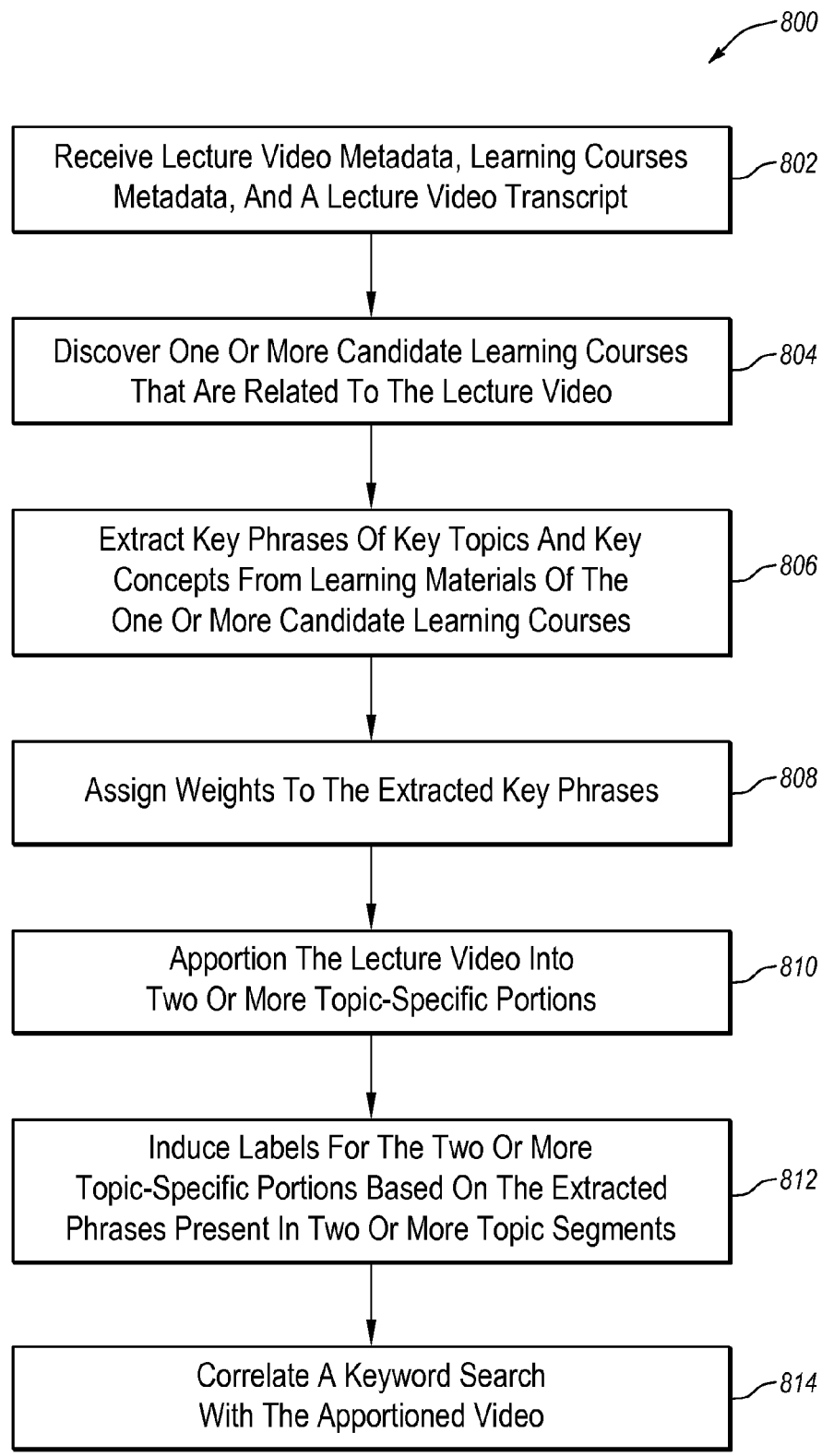
FIG. 8 is a flow diagram of an example method of identifying topics in lecture videos.

FIG. 8 is a flow diagram of an example method 800 of identifying topics in lecture videos, arranged in accordance with at least one embodiment described herein. The method 800 may be programmably performed in some embodiments by the computing device 200 described with reference to FIG. 2. Additionally or alternatively, the method 800 may be programmably performed by the device 104 or the video analysis server 108 of FIG. 1. The device 104, the video analysis server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 800. The device 104, the video analysis server 108, and the computing device 200 may include a processor (e.g., the processor 224 of FIG. 2) that is configured to execute computer instructions to cause or control performance of the method 800. Although illustrated as discrete blocks, various blocks may be divided into additional blocks, combined into fewer blocks, or eliminated, depending on the desired implementation.

The method 802 may begin at block 802, where lecture video metadata, learning courses metadata, and a lecture video transcript may be received. In some embodiments, the lecture video transcript may have transcribed text of a lecture video correlated to time of the lecture video. At block 804, one or more candidate learning courses that are related to the lecture video may be discovered. In some embodiments, the one or more candidate learning courses may be discovered based on a measured similarity between the lecture video metadata and the learning courses metadata.

At block 806, key phrases of key topics and key concepts may be extracted from the learning materials of the one or more candidate learning courses. At block 808, weights may be assigned to the extracted key phrases. The weights may be assigned based on a position of the key phrases in the learning materials, a frequency with which the extracted key phrases appear in the learning materials, the discovered candidate learning course in which the key phrase appears, or some combination thereof.

At block 810, the lecture video may be apportioned into two or more topic-specific portions. In some embodiments, the lecture video may be apportioned into two or more topic-specific portions based on two or more topic segments generated in the lecture video transcript, the key phrases included in the two or more topic segments and the assigned weights of the extracted key phrases. At block 812, labels may be induced for the two or more topic-specific portions. In some embodiments, the labels may be induced based on the extracted phrases present in the two or more topic segments. At block 814, a keyword search may be correlated with the apportioned video.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 9:
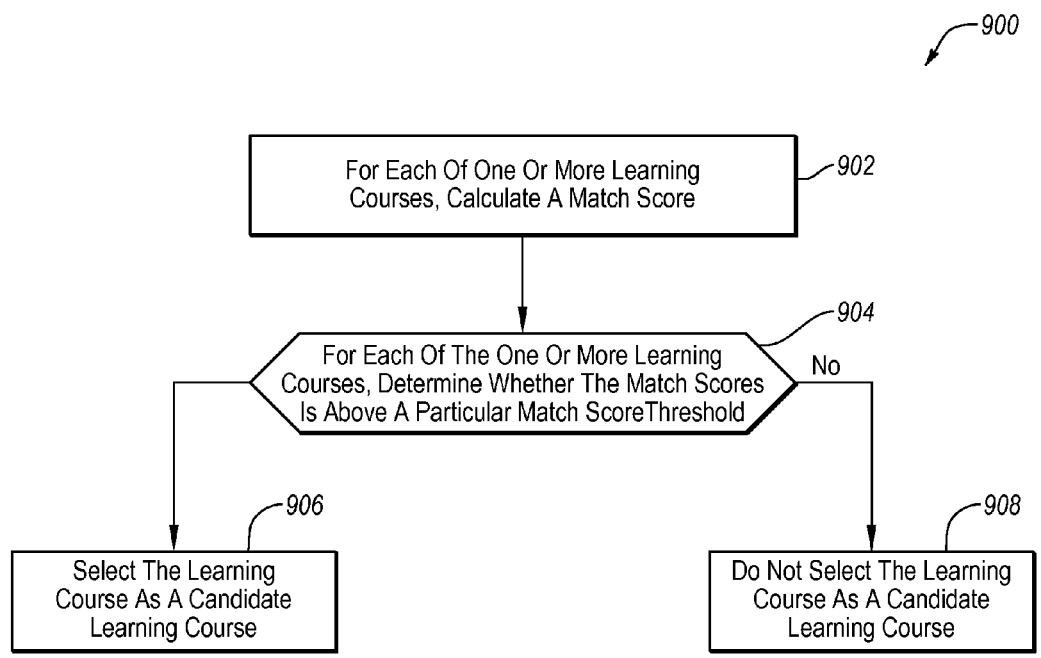
FIG. 9 is a flow diagram of an example method of discovering candidate learning courses.

FIG. 9 is a flow diagram of an example method 900 of discovering candidate learning courses, arranged in accordance with at least one embodiment described herein. The method 900 may be programmably performed in some embodiments by the computing device 200 described with reference to FIG. 2. Additionally or alternatively, the method 900 may be programmably performed by the device 104 or the video analysis server 108 of FIG. 1. The device 104, the video analysis server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 900. The device 104, the video analysis server 108, and the computing device 200 may include a processor (e.g., the processor 224 of FIG. 2) that is configured to execute computer instructions to cause or control performance of the method 900. Although illustrated as discrete blocks, various blocks may be divided into additional blocks, combined into fewer blocks, or eliminated, depending on the desired implementation.

The method 900 may begin at block 902 where a match score for one or more learning courses may be calculated. In some embodiments, the match scores may be based on lecture video metadata and learning courses metadata. For example, calculating the match scores may include calculating text similarities for one or more metadata categories and/or matching one or more metadata categories, assigning weights to each of the metadata categories, and performing a linear combination of the assigned weights and the match scores.

At block 904, for each of the one or more learning courses, it may be determined whether the match scores are above a match score threshold. At block 906, in response to the match score being above the particular match score threshold ("Yes" at 904), the learning course may be selected as a candidate learning course. At block 908, in response to the match score being below the particular match score threshold ("No" at 904), the learning course may not be selected as a candidate learning course.

Figure 10:
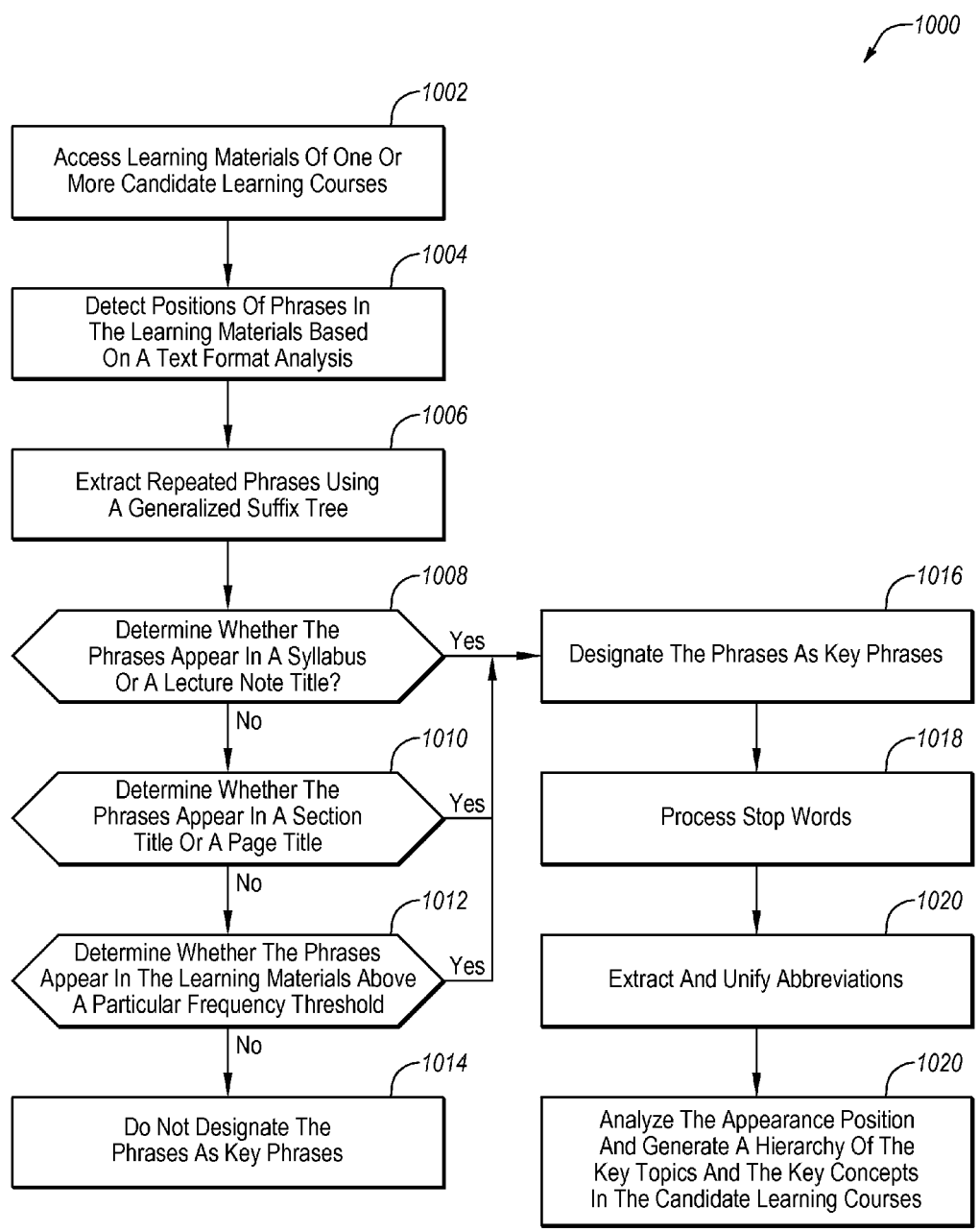
FIG. 10 is a flow diagram of an example method of extracting key phrases.

FIG. 10 is a flow diagram of an example method 1000 of extracting key phrases, arranged in accordance with at least one embodiment described herein. The method 1000 may be programmably performed in some embodiments by the computing device 200 described with reference to FIG. 2. Additionally or alternatively, the method 1000 may be programmably performed by the device 104 or the video analysis server 108 of FIG. 1. The device 104, the video analysis server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 1000. The device 104, the video analysis server 108, and the computing device 200 may include a processor (e.g., the processor 224 of FIG. 2) that is configured to execute computer instructions to cause or control performance of the method 1000. Although illustrated as discrete blocks, various blocks may be divided into additional blocks, combined into fewer blocks, or eliminated, depending on the desired implementation.

The method 1000 may begin at block 1002, where learning materials of the one or more candidate learning courses may be accessed. At block 1004, positions of phrases in the learning materials may be detected based on a text format analysis. At block 1006, repeated phrases may be extracted using a generalized suffix tree.

At block 1008, it may be determined whether the phrases appear in a syllabus or a lecture note title. At block 1016, in response to the phrases appearing in the syllabus or the lecture note title ("Yes" at block 1008), the phrases are designated as key phrases. At block 1010, in response to the phrases not appearing in the syllabus or the lecture note title ("No" at block 1008), it may be determined whether the phrases appear in a section title or a page title. At block 1016, in response to the phrases appearing in the section title or the page title ("Yes" at block 1010), the phrases are designated as key phrases. At block 1012, in response to the phrases not appearing in the section title or the page title ("No" at block 1010), it may be determined whether the phrases appear in the learning materials above a particular frequency threshold. At block 1016, in response to the phrases appearing in the learning materials above a particular frequency threshold ("Yes" at block 1012), the phrases are designated as key phrases. At block 1014, in response to the phrases not appearing in the learning materials above a particular frequency threshold ("No" at block 1014), the phrases may not be designated as key phrases. At block 1018, stop words may be processed in the key phrases. At block 1020, abbreviations may be extracted and/or unified using heuristic rules. At block 1022, the appearance position may be analyzed and a hierarchy of the key topics and the key concepts in the candidate learning courses may be generated based on the extracted key phrases and the weights assigned to the extracted key phrases.

Figure 11:
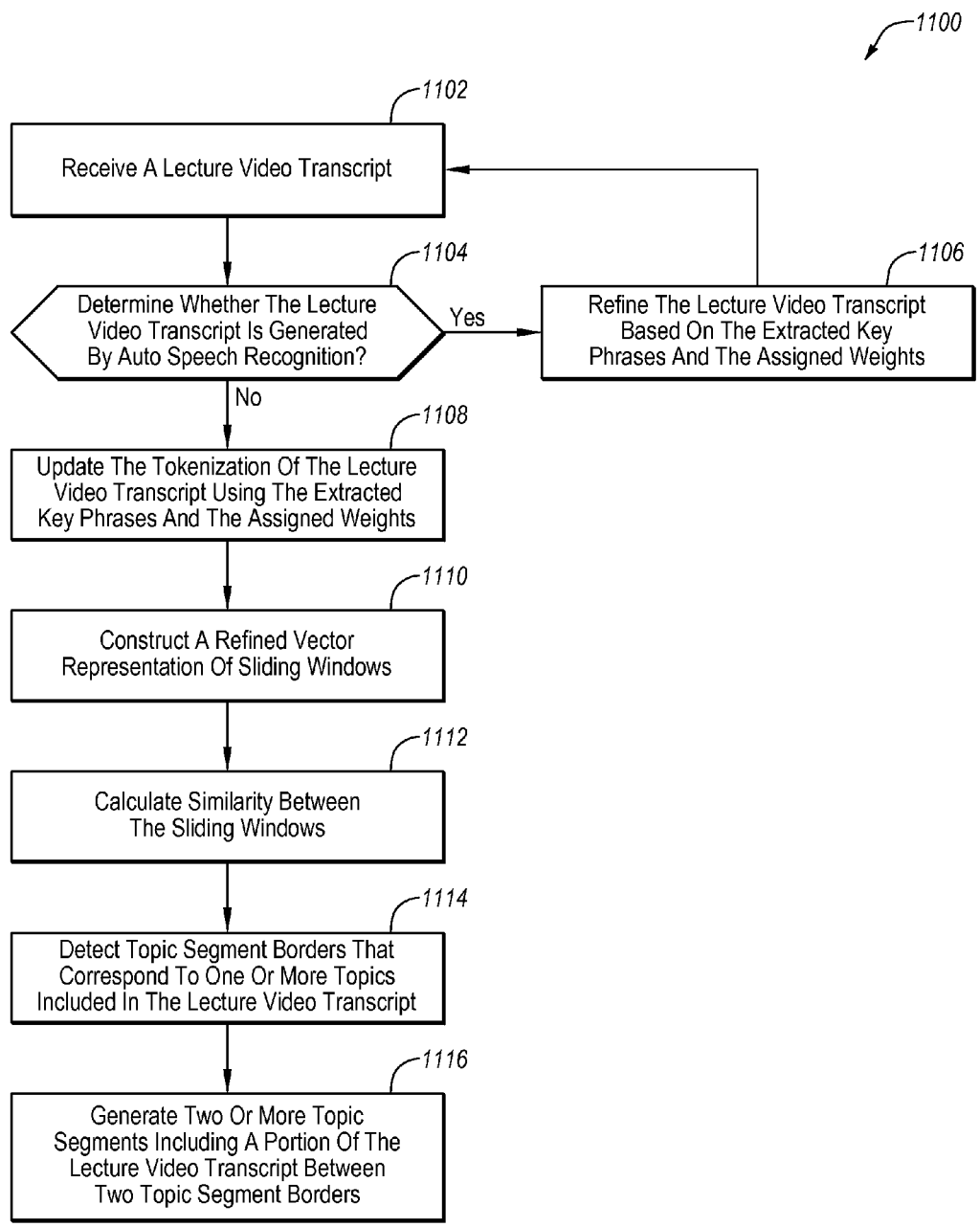
FIG. 11 is a flow diagram of an example method of apportioning a lecture video.

FIG. 11 is a flow diagram of an example method 1100 of apportioning a lecture video, arranged in accordance with at least one embodiment described herein. The method 1100 may be programmably performed in some embodiments by the computing device 200 described with reference to FIG.

2. Additionally or alternatively, the method 1100 may be programmably performed by the device 104 or the video analysis server 108 of FIG. 1. The device 104, the video analysis server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 1100. The device 104, the video analysis server 108, and the computing device 200 may include a processor (e.g., the processor 224 of FIG. 2) that is configured to execute computer instructions to cause or control performance of the method 1100. Although illustrated as discrete blocks, various blocks may be divided into additional blocks, combined into fewer blocks, or eliminated, depending on the desired implementation.

The method 1100 may begin at block 1102, where a transcript may be received. At block 1104, it may be determined whether the transcript is generated by auto speech recognition. At block 1106, in response to determining that the transcript is generated by auto speech recognition ("Yes" at 1104), the transcript may be refined based on the extracted key phrases and the assigned weights and the method 1100 may return to blocks 1102 and 1104. A transcript generated by auto speech recognition that is subsequently refined may not be considered to be generated by auto speech recognition and the method 1100 may proceed to block 1108. Whether the transcript is not initially generated by auto speech recognition, or the transcript is initially generated by auto speech recognition and is subsequently refined, at block 1108, in response to determining that the lecture video transcript is not generated by auto speech recognition ("No" at 1104), the tokenization of the transcript may be updated using the extracted key phrases and the assigned weights.

At block 1110, a refined vector representation of sliding windows may be constructed. At block 1112, similarity between the sliding windows may be calculated. At block 1114, topic segment borders may be detected that correspond to one or more topics included in the transcript. At block 1116, two or more topic segments may be generated. The two or more topic segments may include a portion of the lecture video transcript between two topic segment borders.

Figure 12:
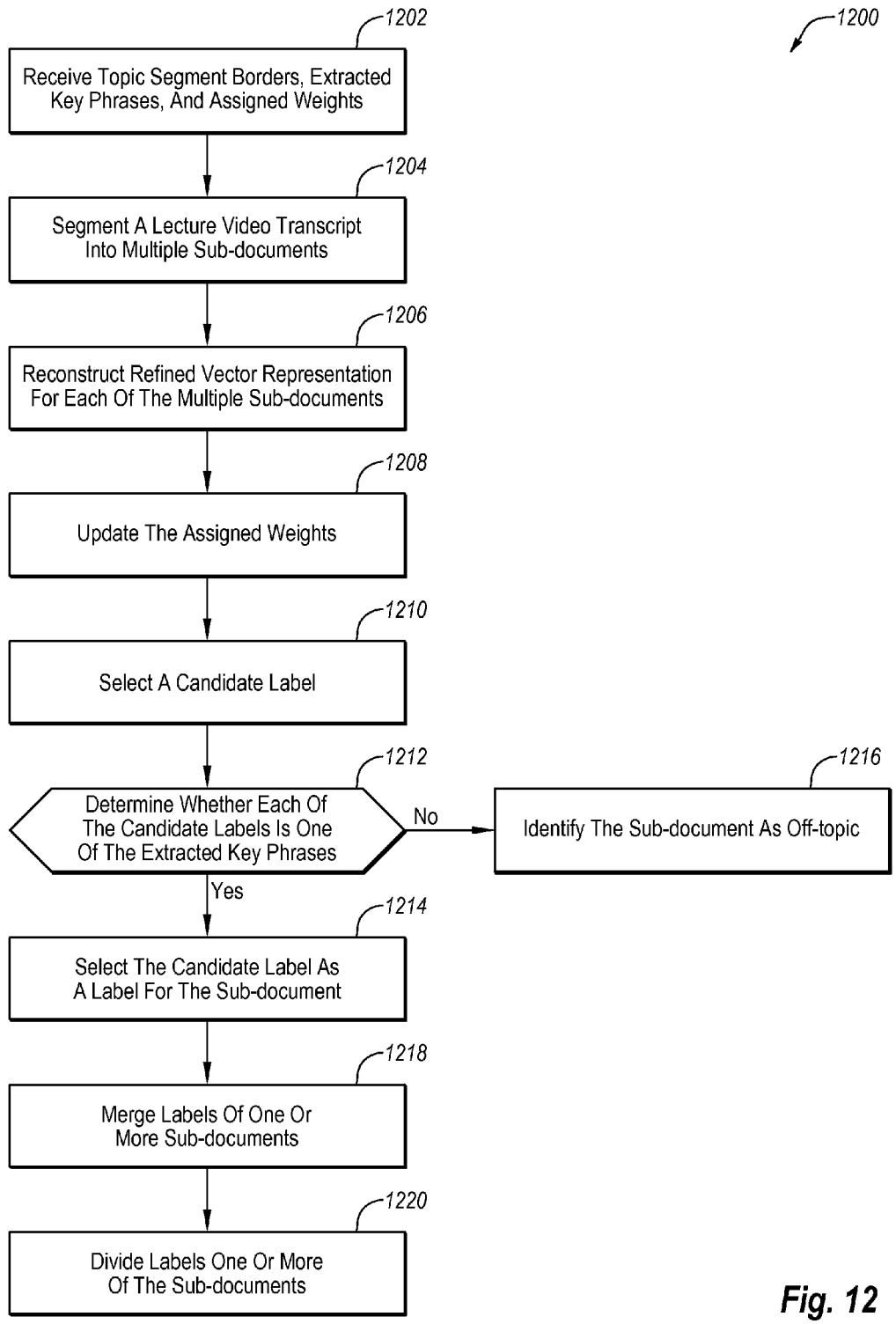
FIG. 12 is a flow diagram of an example method of inducing labels, all arranged in accordance with at least one embodiment described herein.

FIG. 12 is a flow diagram of an example method 1200 of inducing labels, arranged in accordance with at least one embodiment described herein. The method 1200 may be programmably performed in some embodiments by the computing device 200 described with reference to FIG. 2. Additionally or alternatively, the method 1200 may be programmably performed by the device 104 or the video analysis server 108 of FIG. 1. The device 104, the video analysis server 108, and the computing device 200 may include or may be communicatively coupled to a non-transitory computer-readable medium (e.g., the memory 222 of FIG. 2) having stored thereon or encoded therein programming code or instructions that are executable by a processor to perform or cause performance of the method 1200. The device 104, the video analysis server 108, and the computing device 200 may include a processor (e.g., the processor 224 of FIG. 2) that is configured to execute computer instructions to cause or control performance of the method 1200. Although illustrated as discrete blocks, various blocks may be divided into additional blocks, combined into fewer blocks, or eliminated, depending on the desired implementation.

The method 1200 may begin at block 1202, where topic segment borders, extracted key phrases, and assigned weights may be received. At block 1204, the lecture video transcript may be segmented into multiple sub-documents. For example, the lecture video transcript may be segmented based on the topic segment borders. At block 1206, the refined vector representation for each of the multiple sub-documents may be reconstructed. At block 1208, the assigned weights may be updated. For example, in some embodiments, the assigned weights may be updated based on TFIDF in each of the multiple sub-documents.

At block 1210, a candidate label may be selected. For example, in some embodiments, the candidate label may be selected based on the updated assigned weights for each of the multiple sub-documents. At block 1212, it may be determined whether each of the candidate labels is one of the extracted key phrases. At block 1214, in response to the candidate label being one of the extracted key phrases ("Yes" at 1212), the candidate label may be selected as a label for the sub-document. At block 1216, in response to the candidate label not being one of the extracted key phrases, the sub-document may be identified as off-topic. At block 1218, labels of one or more of the sub-documents may be merged. For example, in some embodiments, the labels may be merged based on the hierarchical relationships between the labels for the sub-documents and candidate labels that appear in each of the sub-documents. At block 1220, labels of one or more of the sub-documents may be divided. For example, in some embodiments, the labels may be divided based on the hierarchical relationships between the labels for the sub-documents and candidate labels that appear in each of the sub-documents.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What we claim is:

1. A method of identifying topics in lecture videos, the method comprising:
    accessing learning courses from an open educational resource (OER) server, the learning courses including learning materials for the learning courses and including learning courses metadata that is associated with the learning courses and the learning materials;
    accessing lecture video metadata associated with a lecture video from an educational server;
    accessing a lecture video transcript that includes a transcribed text of the lecture video, the transcribed text being correlated to a time in which verbal recitation of the transcribed text occurred in the lecture video;
    discovering one or more candidate learning courses of the accessed learning courses, the candidate learning courses being related to the lecture video and being based on a measured similarity between the lecture video metadata and the learning courses metadata;
    extracting key phrases from the learning materials of the discovered candidate learning courses;
    assigning weights to the extracted key phrases based on a position of the extracted key phrases in the learning materials of the discovered candidate learning courses, frequencies with which the extracted key phrases appear in the learning materials of the discovered candidate learning courses, and a type of the discovered candidate learning course in which the key phrases appear;
    generating two or more topic segments in the lecture video transcript using sliding-window segmentation, wherein:
        the sliding-window segmentation includes construction of a refined vector representation of windows created in the lecture video transcript,
        each of the generated topic segments includes two topic segment borders and a portion of the lecture video transcript between the two topic segment borders, and
        the topic segment borders of each of the generated topic segments are adjusted based on presence of the extracted key phrases and the assigned weights of the extracted key phrases within the portion of the lecture video transcript between the topic segment borders of each of the generated topic segments; and
    apportioning the lecture video into two or more topic-specific portions based on the two or more topic segments generated in the lecture video transcript and time correlation between the lecture video transcript and the lecture video.

2. The method of claim 1, wherein the discovering includes, for each of the one or more learning courses:
    calculating a match score based on one or more metadata categories of the lecture video metadata and the learning courses metadata;
    determining whether the match score is above a particular match score threshold; and
    in response to the match score being above the particular match score threshold, selecting the learning course as a candidate learning course.

3. The method of claim 1, wherein the extracting includes:
    accessing the learning materials of the discovered candidate learning courses;
    detecting positions of phrases in the learning materials based on a text format analysis;
    extracting repeated phrases using a generalized suffix tree;
    in response to at least one of: the phrases appearing in a syllabus or a lecture note title, the phrases appearing in a section title or a page title, or the phrases appearing in the learning materials above a particular frequency threshold, designating the phrases as key phrases;
    processing stop words in the key phrases; and
    extracting and unifying abbreviations from the key phrases using heuristic rules.

4. The method of claim 1, wherein the extracting includes, based on the extracted key phrases and the weights assigned to the extracted key phrases, analyzing appearance position and generating a hierarchy of key topics and key concepts in the candidate learning courses.

5. The method of claim 1, further comprising:
    determining whether the lecture video transcript is generated by auto speech recognition;
    in response to the lecture video transcript being generated by auto speech recognition, refining the lecture video transcript based on the extracted key phrases and the assigned weights; and
    in response to the lecture video transcript not being generated by auto speech recognition, updating a tokenization of the lecture video transcript using the extracted key phrases and the assigned weights.

6. The method of claim 1, further comprising inducing labels for the two or more topic-specific portions based on the extracted key phrases present in the two or more topic segments.

7. The method of claim 6, wherein the inducing further includes:
    receiving the topic segment borders, the extracted key phrases, and the assigned weights of each of the generated topic segments;
    based on topic window borders, segmenting the lecture video transcript into multiple sub-documents;
    reconstructing a refined vector representation for each of the multiple sub-documents;
    updating the assigned weights based on term frequency-inverse document frequency (TF-IDF) in each of the multiple sub-documents;
    selecting a candidate label based on the updated assigned weights for each of the multiple sub-documents;
    determining whether each of the candidate labels is one of the extracted key phrases;
    in response to the candidate label being one of the extracted key phrases, selecting the candidate label as a label for the sub-document; and in response to the candidate label not being one of the extracted key phrases, identifying the sub-document as off-topic.

8. The method of claim 7, further comprising:
merging labels of one or more of the sub-documents based on hierarchical relationships between the labels for the sub-documents and candidate labels that appear in each of the sub-documents; or
dividing labels of one or more of the sub-documents based on the hierarchical relationships between the labels for the sub-documents and candidate labels that appear in each of the sub-documents.

9. The method of claim 1, further comprising correlating a keyword search with the apportioned video.

10. A non-transitory computer-readable medium having encoded therein programming code executable by a processor to perform operations comprising:
accessing learning courses from an open educational resource (OER) server, the learning courses including learning materials for the learning courses and including learning courses metadata that is associated with the learning courses and the learning materials;
accessing lecture video metadata associated with a lecture video from an educational server;
accessing a lecture video transcript that includes a transcribed text of the lecture video, the transcribed text being correlated to a time in which verbal recitation of the transcribed text occurred in the lecture video;
discovering one or more candidate learning courses of the accessed learning courses, the candidate learning courses being related to the lecture video and being based on a measured similarity between the lecture video metadata and the learning courses metadata;
extracting key phrases from the learning materials of the discovered candidate learning courses;
assigning weights to the extracted key phrases based on a position of the extracted key phrases in the learning materials of the discovered candidate learning courses, frequencies with which the extracted key phrases appear in the learning materials of the discovered candidate learning courses, and a type of the discovered candidate learning course in which the key phrases appear;
generating two or more topic segments in the lecture video transcript using sliding-window segmentation, wherein:
the sliding-window segmentation includes construction of a refined vector representation of windows created in the lecture video transcript,
each of the generated topic segments includes two topic segment borders and a portion of the lecture video transcript between the two topic segment borders, and
the topic segment borders of each of the generated topic segments are adjusted based on presence of the extracted key phrases and the assigned weights of the extracted key phrases within the portion of the lecture video transcript between the topic segment borders of each of the generated topic segments; and
apportioning the lecture video into two or more topic-specific portions based on the two or more topic segments generated in the lecture video transcript and time correlation between the lecture video transcript and the lecture video.

11. The non-transitory computer-readable medium of claim 10, wherein the discovering includes, for each of the one or more learning courses:
calculating a match score based on one or more metadata categories of the lecture video metadata and the learning courses metadata;
determining whether the match score is above a particular match score threshold; and
in response to the match score being above the particular match score threshold, selecting the learning course as a candidate learning course.

12. The non-transitory computer-readable medium of claim 10, wherein the extracting includes:
accessing the learning materials of the discovered candidate learning courses;
detecting positions of phrases in the learning materials based on a text format analysis;
extracting repeated phrases using a generalized suffix tree;
in response to at least one of: the phrases appearing in a syllabus or a lecture note title, the phrases appearing in a section title or a page title, or the phrases appearing in the learning materials above a particular frequency threshold, designating the phrases as key phrases;
processing stop words in the key phrases; and
extracting and unifying abbreviations from the key phrases using heuristic rules.

13. The non-transitory computer-readable medium of claim 10, wherein the extracting includes, based on the extracted key phrases and the weights assigned to the extracted key phrases, analyzing appearance position and generating a hierarchy of key topics and key concepts in the candidate learning courses.

14. The non-transitory computer-readable medium of claim 10, wherein the operations further comprise:
determining whether the lecture video transcript is generated by auto speech recognition;
in response to the lecture video transcript being generated by auto speech recognition, refining the lecture video transcript based on the extracted key phrases and the assigned weights; and
in response to the lecture video transcript not being generated by auto speech recognition, updating a tokenization of the lecture video transcript using the extracted key phrases and the assigned weights.

15. The non-transitory computer-readable medium of claim 10, wherein the operations further comprise inducing labels for the two or more topic-specific portions based on the extracted key phrases present in the two or more topic segments.

16. The non-transitory computer-readable medium of claim 15, wherein the inducing further includes:
receiving the topic segment borders, the extracted key phrases, and the assigned weights of each of the generated topic segments;
based on topic window borders, segmenting the lecture video transcript into multiple sub-documents;
reconstructing a refined vector representation for each of the multiple sub-documents;
updating the assigned weights based on term frequency-inverse document frequency (TF-IDF) in each of the multiple sub-documents;
selecting a candidate label based on the updated assigned weights for each of the multiple sub-documents;
determining whether each of the candidate labels is one of the extracted key phrases;
in response to the candidate label being one of the extracted key phrases, selecting the candidate label as a label for the sub-document; and in response to the candidate label not being one of the extracted key phrases, identifying the sub-document as off-topic.

17. The non-transitory computer-readable medium of claim 16, wherein the operations further comprise:
merging labels of one or more of the sub-documents based on hierarchical relationships between the labels for the sub-documents and candidate labels that appear in each of the sub-documents; or
dividing labels of one or more of the sub-documents based on the hierarchical relationships between the labels for the sub-documents and candidate labels that appear in each of the sub-documents.

18. The non-transitory computer-readable medium of claim 10, wherein the operations further comprise correlating a keyword search with the apportioned video.

* * * * *